US012270212B2

(12) United States Patent
Beckmann et al.

(10) Patent No.: US 12,270,212 B2
(45) Date of Patent: Apr. 8, 2025

(54) ENHANCED LIFT ASSIST DEVICE

(71) Applicant: Construction Robotics, LLC, Victor, NY (US)

(72) Inventors: Andrew Walter Beckmann, West Henrietta, NY (US); Scott Lawrence Peters, West Henrietta, NY (US); Glenn Dayton White, Conesus, NY (US); David Wesley Lombardo, Walkersville, MD (US); Greg Brulo, Greencastle, PA (US); Ji Hong Hao, Frederick, MD (US); Matthew Ian Gilbride, Gaithersburg, MD (US); David Whitney Lyndaker, Byron, NY (US); Charles Alfred Streb, IV, Rochester, NY (US); William Lewis Martz, Victor, NY (US)

(73) Assignee: Construction Robotics, LLC, Victor, NY (US)

(*) Notice: Subject to any disclaimer, the term of this patent is extended or adjusted under 35 U.S.C. 154(b) by 214 days.

(21) Appl. No.: 17/799,260

(22) PCT Filed: Feb. 14, 2021

(86) PCT No.: PCT/US2021/018074

§ 371 (c)(1),
(2) Date: Aug. 11, 2022

(87) PCT Pub. No.: WO2021/163657

PCT Pub. Date: Aug. 19, 2021

(65) Prior Publication Data

US 2023/0076909 A1 Mar. 9, 2023

Related U.S. Application Data

(60) Provisional application No. 62/976,517, filed on Feb. 14, 2020.

(51) Int. Cl.
*B66C 1/42* (2006.01)
*B66C 13/44* (2006.01)
(Continued)

(52) U.S. Cl.
CPC .............. *E04G 21/16* (2013.01); *B66C 1/425* (2013.01); *B66C 13/44* (2013.01); *B66C 23/04* (2013.01); *B66C 23/68* (2013.01); *B66D 3/20* (2013.01)

(58) Field of Classification Search
CPC ... B66D 3/18; B66D 3/20; B66D 3/08; B66D 3/16; B66D 2700/025; B66C 1/44;
(Continued)

(56) References Cited

U.S. PATENT DOCUMENTS 5,431,526 A * 7/1995 Peterson ................ B66C 23/44 212/231
5,758,785 A * 6/1998 Spinosa .................. B66C 23/68 212/300

(Continued)

FOREIGN PATENT DOCUMENTS

DE 4119289 A1 * 1/1992
DE 10323546 A1 * 12/2004 ........... B66C 23/905

(Continued)

OTHER PUBLICATIONS

Author Unknown, Binar Handling AB Website, Oct. 23, 2022, www.binarhandling.com/en/products/manipulator-arms, Trollhattan, Sweden.

(Continued)

*Primary Examiner* — Michael R Mansen
*Assistant Examiner* — Henrix Soto
(74) *Attorney, Agent, or Firm* — Patent Technologies, LLC; Robert D. Gunderman, Jr.

(57) ABSTRACT

An Enhanced Lift Assist Device is described. The device allows a user to lift and manipulate large, heavy or bulky (Continued)

items by applying force to the item as opposed to traditional control methods such as buttons. This force based system provides ease of movement of the item, making it appear much lighter than it actually is. The Enhanced Lift Assist Device also includes an adjustable base that allows for change of orientation of the device that may include leveling or self-leveling functionality, allowing the device to be operated in non-traditional environments that require leveling or operational adjustments for proper functioning.

13 Claims, 35 Drawing Sheets

(51) Int. Cl.
*B66C 23/04* (2006.01)
*B66C 23/68* (2006.01)
*B66D 3/20* (2006.01)
*E04G 21/16* (2006.01)

(58) Field of Classification Search
CPC ........... B66C 1/442; B66C 1/445; B66C 1/42; B66C 13/18; B66C 13/16; B66C 13/14; B66C 23/88; B66C 23/90; B66C 23/905; B66C 23/62; B66C 23/18; B66C 23/68; B66C 23/26; B66C 23/022; B66C 9/14; B66C 13/12
USPC .......................................................... 212/276
See application file for complete search history.

(56) References Cited

U.S. PATENT DOCUMENTS

| | | | | |
|---|---|---|---|---|
| 5,865,426 | A | 2/1999 | Kazerooni | |
| 5,915,673 | A * | 6/1999 | Kazerooni | B66F 3/242 254/270 |
| 6,299,139 | B1 | 10/2001 | Kazerooni | |
| 6,386,513 | B1 | 5/2002 | Kazerooni | |
| 6,622,990 | B2 | 9/2003 | Kazerooni | |
| 7,377,740 | B2 * | 5/2008 | Panzarella | B60P 1/5433 212/180 |
| 7,559,533 | B2 | 7/2009 | Stockmaster et al. | |
| 8,109,550 | B1 * | 2/2012 | Benjamin | B66D 3/18 294/67.31 |
| 9,061,868 | B1 * | 6/2015 | Paulsen | B66C 1/0218 |
| 10,508,006 | B1 * | 12/2019 | Marianetti | B66C 23/44 |
| 2002/0066710 | A1 * | 6/2002 | Spitsbergen | B66C 23/44 212/179 |
| 2003/0057408 | A1 * | 3/2003 | Kazerooni | G06F 3/011 254/270 |
| 2019/0238182 | A1 * | 8/2019 | Oh | H04B 3/54 |

FOREIGN PATENT DOCUMENTS

| | | | | |
|---|---|---|---|---|
| DE | 202016004674 U1 | * | 12/2016 | |
| EP | 0751090 A1 | * | 1/1997 | |
| GB | 723070 A | * | 2/1955 | |
| GB | 913507 A | * | 12/1962 | |
| WO | WO-2019040342 A1 | * | 2/2019 | B66C 1/0243 |
| WO | WO-2019081412 A1 | * | 5/2019 | B66B 7/062 |

OTHER PUBLICATIONS

Author Unknown, Ergonomic Partners Website, Oct. 23, 2022, www.ergonomicpartners.com/bobb-concrete-block-wall-builder, Bridgeton, MO, USA.
Author Unknown, Gorbel Website, Oct. 23, 2022, www.gorbel.com/products/ergonomic-lifting, Victor, NY, USA.

* cited by examiner

ENHANCED LIFT ASSIST DEVICE

CROSS REFERENCE TO RELATED PATENT APPLICATIONS

This application claims priority to U.S. Patent Application Ser. No. 62/976,517 filed Feb. 14, 2020 entitled "Enhanced Lift Assist Device" to Construction Robotics, LLC, and to International Application Number PCT/US2021/018074 filed Feb. 14, 2021, the entire disclosures of which are incorporated herein by reference.

BACKGROUND OF THE INVENTION

1. Field of the Invention

The present invention relates generally to lifting equipment, and more particularly to an Enhanced Lift Assist Device for user directed lifting and placement of items in which user interaction with the lifted component is critical.

2. Description of Related Art

Various hoists and lifts for the lifting and placement of heavy items are currently available. This equipment reduces fatigue and injury among workers, increases productivity, speeds up completion of jobs, and improves the overall quality of the job.

Many larger and bulkier items require multiple workers for movement and placement of an item, and often require specialized fixtures or tools for movement and placement of the item. Oftentimes, the use of multiple workers is either not possible or is cost prohibitive.

What is therefore needed is a device that allows a single worker to handle large, heavy and bulky items. What is also needed is a device that moves and places an item while under the direct control of the worker where movement of the item by the worker is assisted by the device through the application of three by the user where the user applied force is supplemented and effectively amplified by the device. What is also needed is an adaptable and multi-functional device allowing for operation in an environment such as a construction site or the like.

BRIEF SUMMARY OF THE INVENTION

In accordance with the present invention, there is provided an Enhanced Lift Assist Device having an adjustable base; an articulating arm assembly coupled to the adjustable base; a lifting element in communication with a variable displacement mechanism; a control handle operationally joined to the lifting element; a tool coupled with the lifting element; a force sensor that detects force applied by a user: and a computer-based force amplifier that converts user applied force received by the force sensor to mechanical force applied to the tool.

The foregoing paragraph has been provided by way of introduction, and is not intended to limit the scope of the invention as described by this specification, claims and the attached drawings.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and drawings attached hereto.

DESCRIPTION OF THE PREFERRED EMBODIMENTS

The Enhanced Lift Assist Device, as described herein, allows a user to directly interact with an item, such as a building component or tool, to control the movement of that item without the necessity of an interface. The worker applies force to the item in the direction required, be it up, down, to either side, or some combination thereof. The Enhanced Lift Assist Device then assists the user relative to the force that was inputted, to move the item in the correct way. This movement is done directly with the worker contacting and moving the item as if weight were not an issue. The Enhanced Lift Assist Device senses, collects, processes and reacts to the forces applied by the worker to the item to create a sense of ease and weightlessness. The reaction by the enhanced lilt assist device to a user applied force may be, for example, amplification, resistance, or nothing (ignore input). In one embodiment of the present invention, the Enhanced Lift Assist Device provides lift assistance in the vertical axis, while horizontal movement is not mechanized. In some embodiments, the present invention has degrees of freedom to allow for manual horizontal movement while in others horizontal movement is driven through electrical/hydraulic means by actuators, motors, or the like. This is accomplished through human force and associated movement thereof. In these embodiments, proper leveling of the motion surface is critical both to ensure ease of horizontal movement as well as safety of the worker while working with a suspended load. This applies to various embodiments of the present invention including, but not limited to, an arm based system as well as a mono-rail based system.

Turning now to the drawings, detailed views of the Enhanced Lift Assist Device can be seen.

Figure 1:
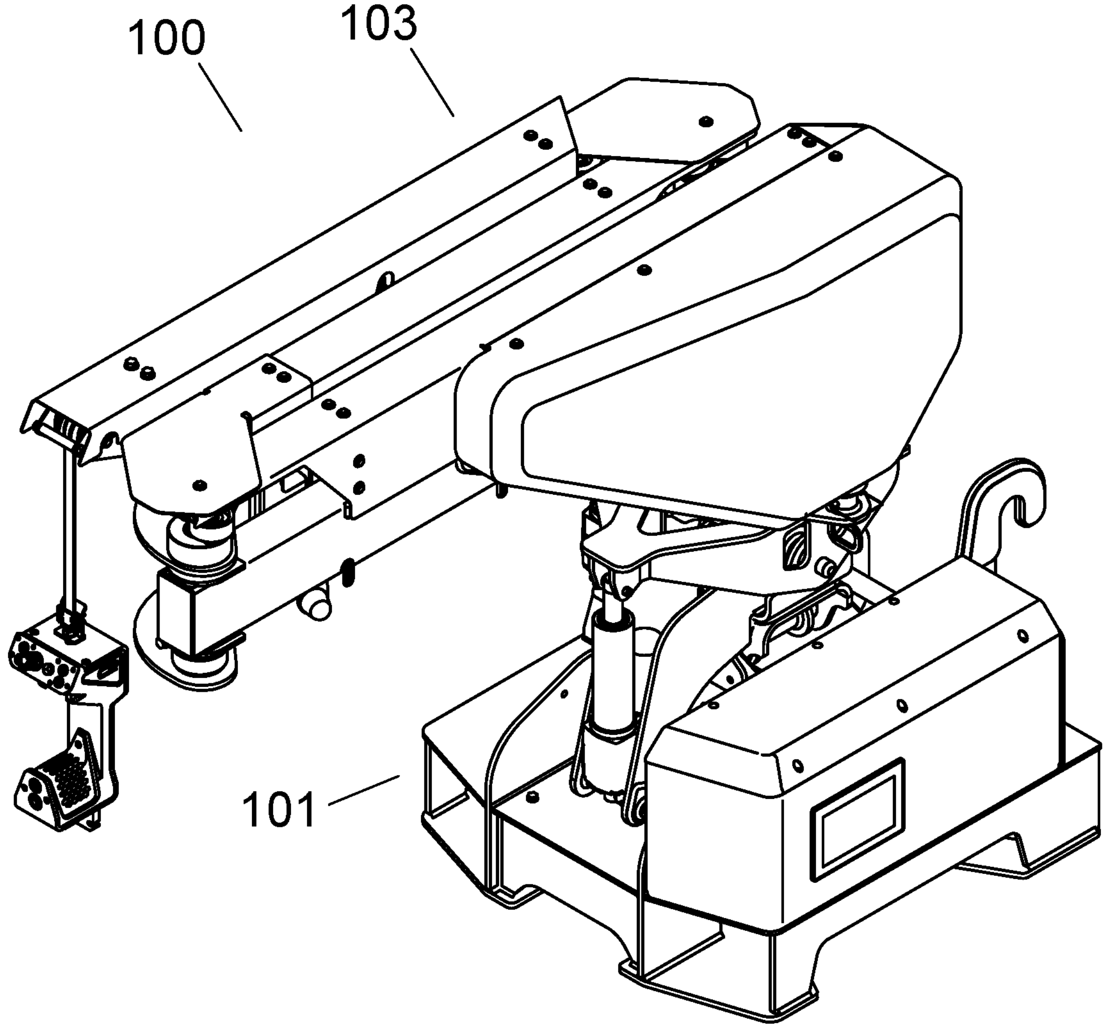
FIG. 1 is a perspective view of an Enhanced Lift Assist Device.

In FIG. 1, a perspective view of the Enhanced Lift Assist Device 100 is depicted. The Enhanced Lift Assist Device depicted is a novel belt based version where the lifting element 261 (see FIG. 2) is a belt. In other embodiments of the present invention, the lifting element 261 may be a cable, a rope, a chain, wire rope, or the like. The belt may be made of a rubber or similar flexible material, and may be reinforced with fibers, threads, or strands of polyester, metal, aramid, or the like. In some embodiments, the lifting element may have metallic elements that may serve to transmit electrical signals and/or power. An electrically conductive belt which serves as the lifting element 261 negates the need for a large and expensive battery. Either no battery or a small battery or ultracapacitor may instead be placed in an operating handle or the like. A battery, capacitor or ultracapacitor may be needed to handle instantaneous current draw from the electric motor during start up or high load conditions, and would receive charge from the electrically conductive belt as needed. With a conductive belt arrangement, a means to transfer electrical power from a stationary to a moving element is needed. A slip ring and brush arrangement, for example, may be employed. A brush or related stationary contact may also be employed having electrically direct contact with a conductive surface of the electrically conductive belt. One example of an electrically conductive belt is United States Published Patent Application 20150285334 to the Gates Corporation, Denver, Colorado, the entire disclosure of which is incorporated herein by reference in its entirety. In some embodiments of the present invention, electrical signals may be conveyed through the electrically conductive belt either with separate conductive elements or constituents or through a modulation technique such as power carrier modulation with the appropriate signal processing and filtering needed for such an arrangement.

Figure 2:
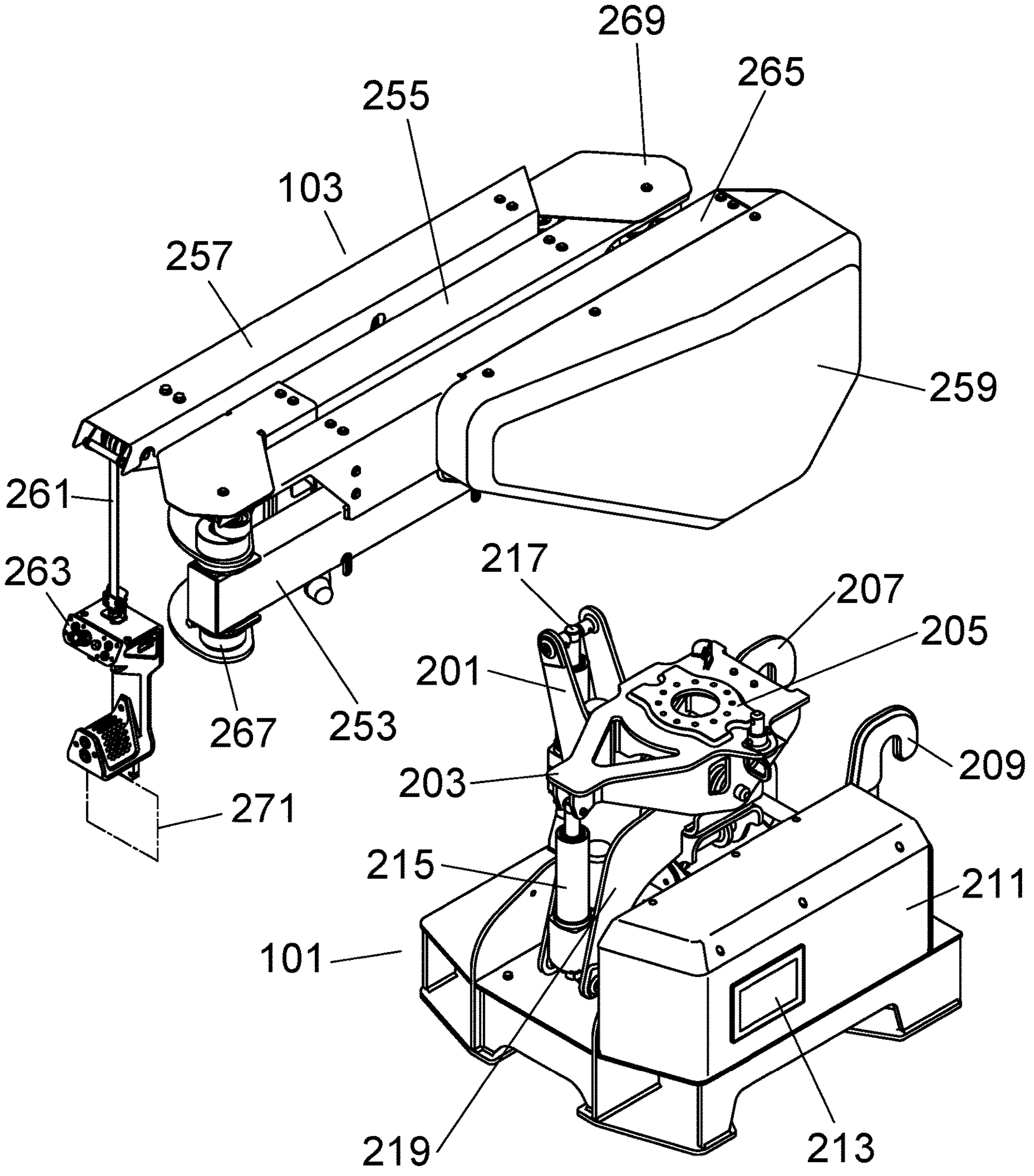
FIG. 2 is a perspective view of the enhanced lift assist device of FIG. 1 split into two assemblies.

While there are a multitude of mechanical and electrical components and systems that make up the Enhanced Lift Assist Device 100, for clarity and case of description the Enhanced Lift Assist Device 100 can be fundamentally described in terms of an adjustable base 101 that is coupled or otherwise attached to an articulating arm assembly 103. Each of these two fundamental assemblies and their related components will be further described herein. FIGS. 2-8 depict various views of the Enhanced Lift Assist Device. FIG. 2 is a perspective view of the lift assist device of FIG. 1 split into two assemblies. The adjustable base 101 will be described first. It should be noted that while the adjustable base 101 may also be described herein as a self-leveling base, it may be used for purposes other than to leveling the enhanced lift assist device 100. For example, there may be uses that require the enhanced lift assist device 100 to be operated on an incline, at an angle, or other orientation that is facilitated by adjustment and operation of the adjustable base 101. A rotational mount 205 can be seen where the articulating arm assembly 103 attaches. The rotational mount 205 may be a metal plate with mounting points, such as holes for bolts, rivets, clamps, fasteners, or the like. A pivot plate 203 can be seen attached to or otherwise formed with the rotational mount 205. The rotational mount 205 has a pin, hinge, or similar structure that allows the rotational mount 205 and mounted articulating arm assembly 103 to move along a first horizontal axis through a first actuator 215. The first actuator 215 is pivotally connected to the pivot plate 203 such that an extension of the first actuator 215 results in positive angular displacement of the rotational mount 205 and retraction of the first actuator 215 results in negative angular displacement of the rotational mount 205. It should be noted that the terms positive angular displacement and negative angular displacement are relative, and may be interchanged dependent on point of reference. On one end of the first actuator 215, a pivot plate 203 is attached, where a first actuator linkage 219 is attached to the opposing end of the first actuator 215. To provide a range of motion in a second horizontal axis, a second actuator 217 can be seen with a second actuator linkage 201, attached to the first actuator linkage 219. The first actuator 215 and the second actuator 217 provide angular control of the articulating arm assembly 103 with respect to the base 101. Actuators include, but are not limited to, electric or electromagnetic actuators, pneumatic actuators, hydraulic actuators, and the like. Sensors such as electronic levels are employed to provide control signals to a microcontroller that in turn enable a power source to control an actuator, thus permitting angular control of the device in use using data from the sensors that may include, for example, angular position and the like. A housing 211 can also be seen, and will be further described herein. The housing 211 contains a microcontroller/microprocessor(s), drive circuitry, a power source, power electronics, and a user interface 213. The user interface 213 may, for example, be a touch screen or the like. In some embodiments of the present invention, a pendant controller may provide an additional or the primary user interface. The pendant controller contains user interface functionality, and may be wired or wireless. Further electronic components, subassemblies and assemblies may be located elsewhere. As the Enhanced Lift Assist Device 100 can be attached or otherwise mounted to a variety of bases, a mounting arrangement such as the first mounting hook 207 and the second mounting hook 209 may be employed. These mounting hooks, preferably made of a metal such as steel, are configured to receive a mounting rod that is in turn secured to a platform, base, or the like. A motion lock may be added to prevent relative motion between the adjustable base 101 and articulating arm assembly 103. This lock can be used for preventing machine motion during transport and the like, and may comprise, for example, a strap, a chain, a clasp, a linkage, a pin, or the like.

The articulating arm assembly 103 can be seen exploded away from the adjustable base 101. A first arm 253, a second arm 255 and a third arm 257 can be seen coupled one to the other by a first joint 265, a second joint 267 and a third joint 269. In some embodiments each arm has an additional element attached that allows drag to be added to the rotation, allowing for greater controllability of the assembly. This element may be adjustable, for example, drag can be added or removed through manipulation of a screw or lever. Within each of the arms is a pulley and lifting element arrangement that will be further described by way of FIG. 21. In some embodiments, more or less than three arms may be employed. A drive cover 259 can also be seen that protects a drive motor and drum assembly and serves as a safety guard. Extending from the third arm 257 is a lifting element 261 that is depicted as a belt made from a flexible material such as rubber, urethane, or the like, with possible reinforcing material such as polyester or metal strands. The use of a novel belt arrangement as a lifting element necessitates a pulley arrangement such as that depicted in FIGS. 21 and 22 and described herewith. In some embodiments of the present invention, the lifting element may be a cable, a rope, a chain, or the like. Connected to the operable end of the lifting element 261 is a control handle 263 that provides a user interface and also has a coupling or similar attachment to connect a tool 271. Additionally an element may tie together the first arm 253 and third arm 257 to prevent relative motion between them. This provides the same functionality as a motion lock to restrain all axes of motion during transport, and may comprise, for example, a strap, a chain, a clasp, a linkage, a pin, or the like.

Figure 3:
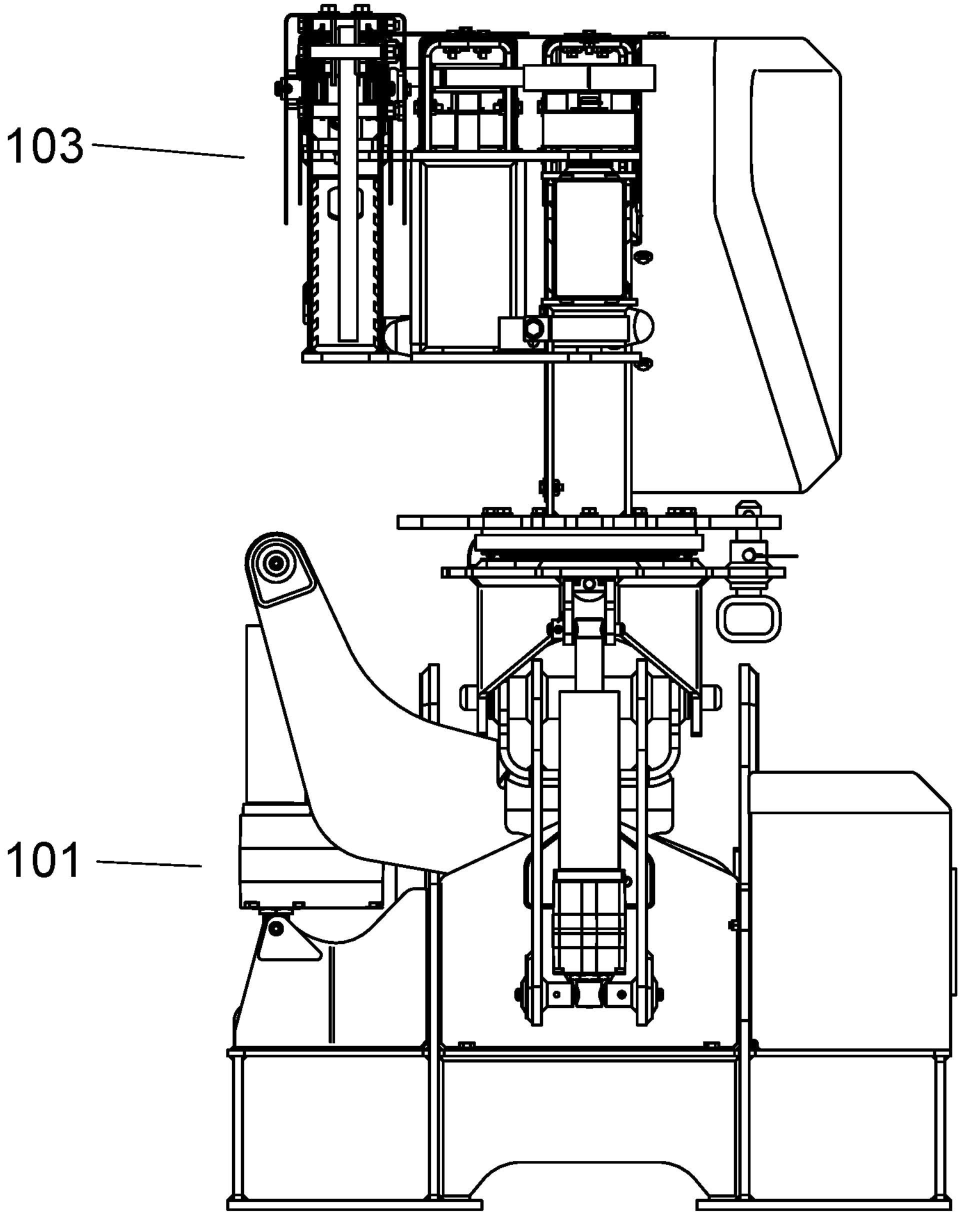
FIG. 3 is a first side plan view of the enhanced lift assist device of FIG. 1.

FIG. 3 is a first side plan view of the Enhanced Lilt Assist Device where the articulating arm assembly 103 can be seen coupled to the self-leveling base 101.

Figure 4:
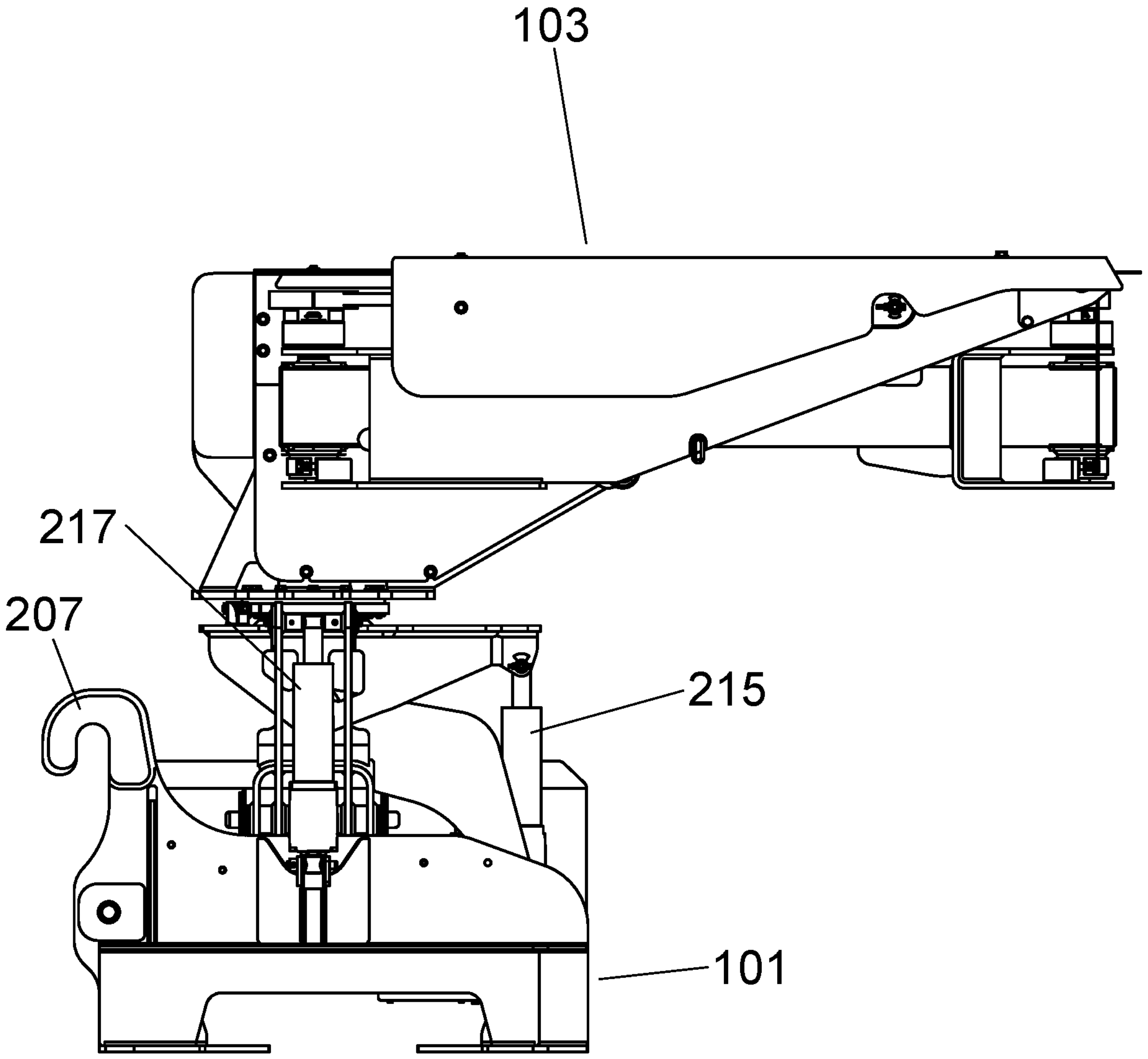
FIG. 4 is a second side plan view of the enhanced lift assist device of FIG. 1.

FIG. 4 is a second side plan view of the Enhanced Lift Assist Device where the first actuator 215 and the second actuator 217 can be clearly seen.

Figure 5:
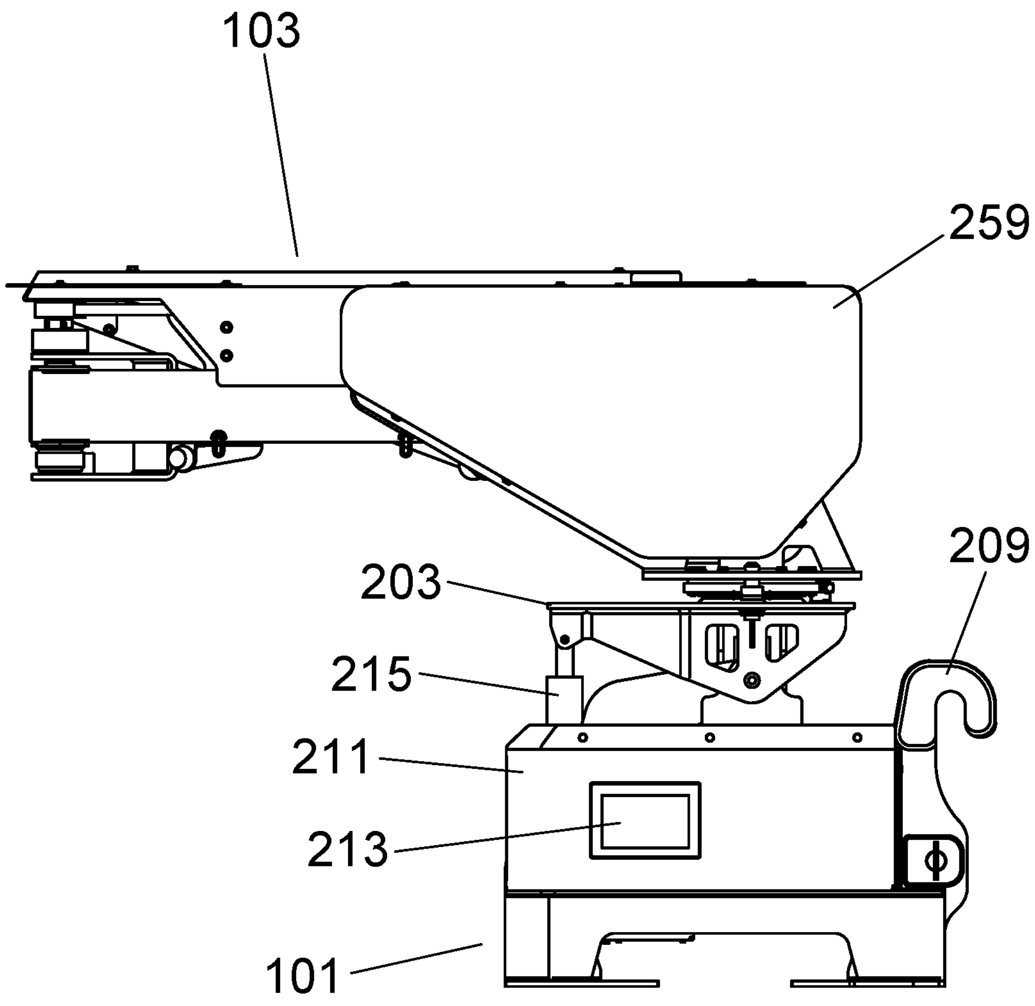
FIG. 5 is a third side plan view of the enhanced lift assist device of FIG. 1.

FIG. 5 is a third side plan view of the Enhanced Lift Assist Device showing clearly the pivot plate 203 and related actuator along with the user interface 213.

Figure 6:
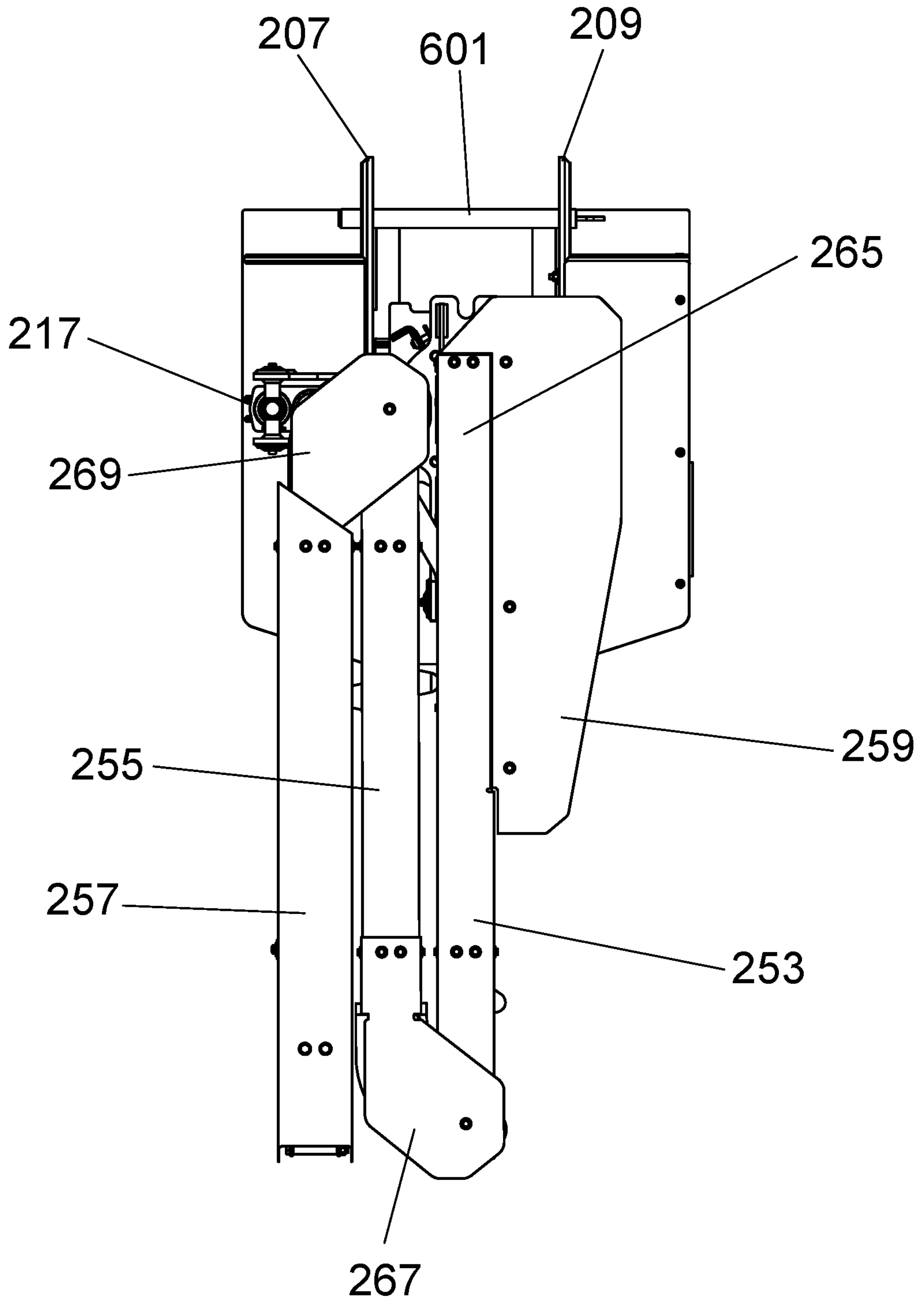
FIG. 6 is a top plan view of the enhanced lift assist device of FIG. 1.

FIG. 6 is a top plan view of the Enhanced Lift Assist Device showing the articulating arm arrangement in a collapsed position. A retention pin 601 can be seen inserted through the first mounting hook 207 and the second mounting hook 209.

Figure 7:
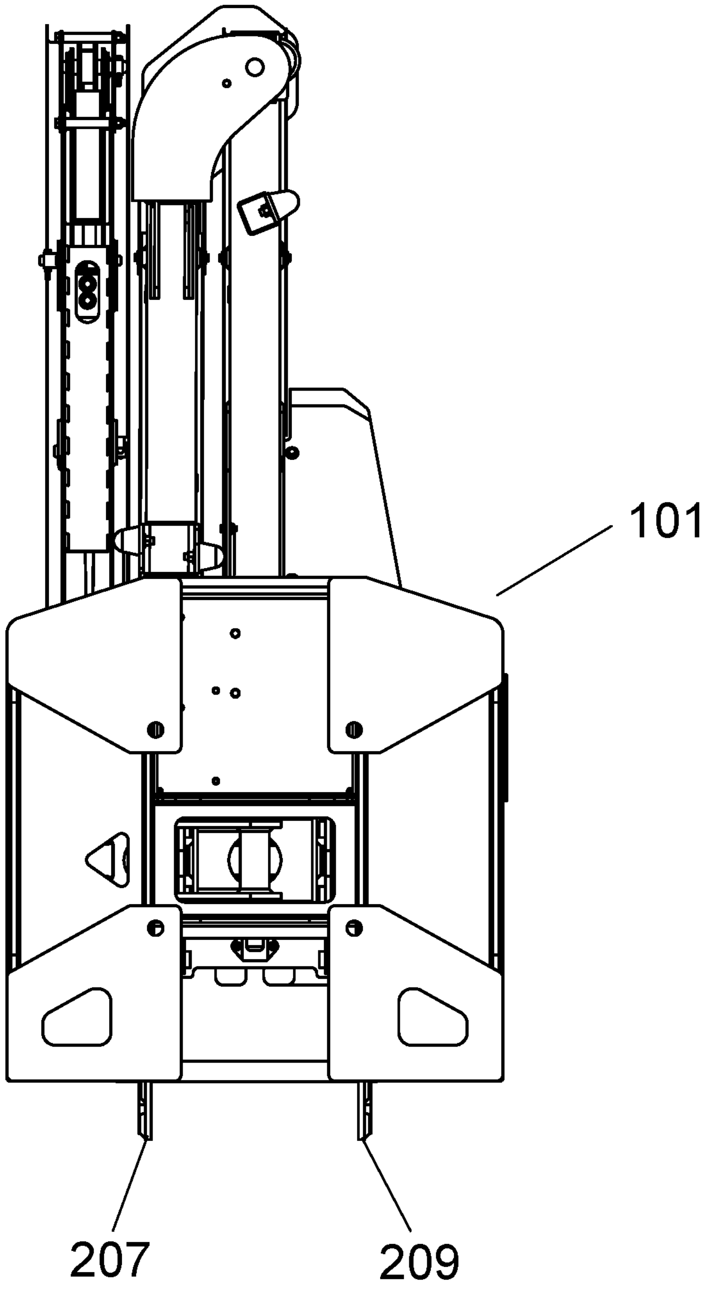
FIG. 7 is a bottom plan view of the enhanced lift assist device of FIG. 1.
Figure 8:
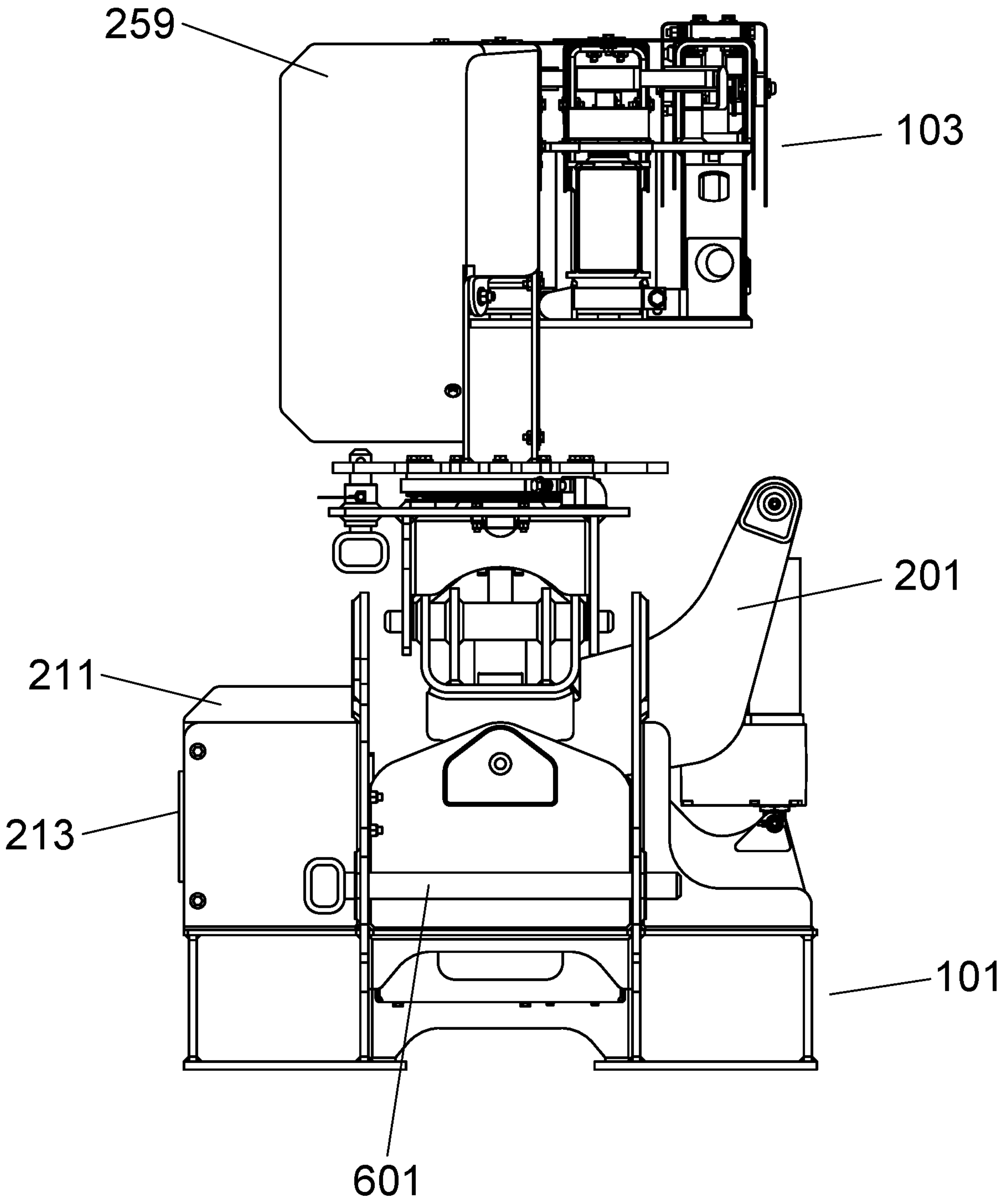
FIG. 8 is a fourth side plan view of the enhanced lift assist device of FIG. 1.

FIG. 7 is a bottom plan view of the Enhanced Lift Assist Device, and FIG. 8 is a fourth side plan view of the Enhanced Lift Assist Device.

Figure 9:
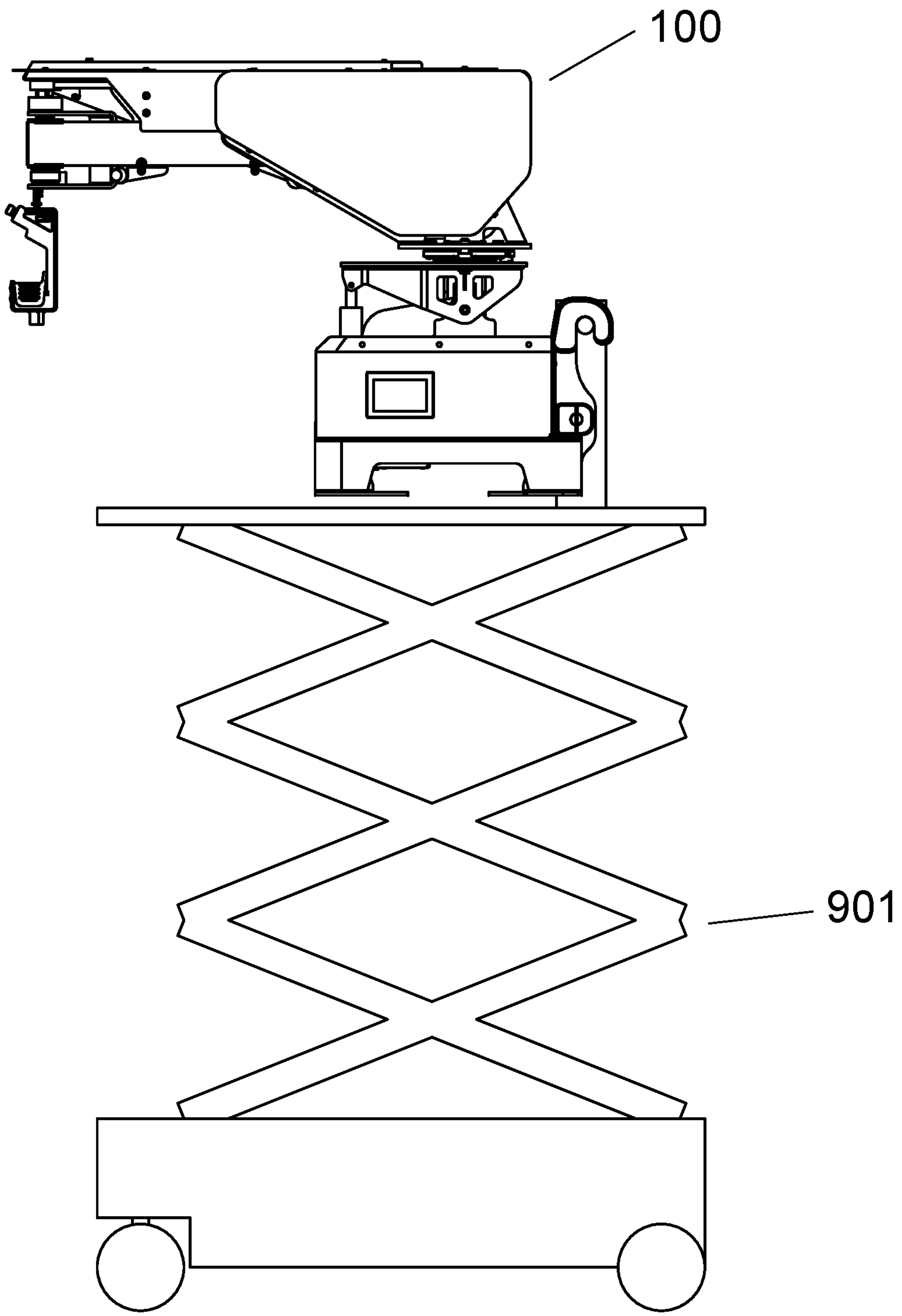
FIG. 9 depicts the enhanced lift assist device with a dynamic base.

The Enhanced Lift Assist Device 100, as evident from the figures thus far, can be considered portable or otherwise mountable on a variety of surfaces and structures. In some installations, the lift assist device may be permanently mounted to a floor such as a concrete floor, or even an overhead beam or support arrangement. Other bases may also be employed. For example, FIG. 9 depicts the lift assist device with a dynamic base 901 that may have wheels, tracks, or the like. The dynamic base may also be vertically extendable, as in the case of a scissor jack or hydraulic lift base.

Figure 10:
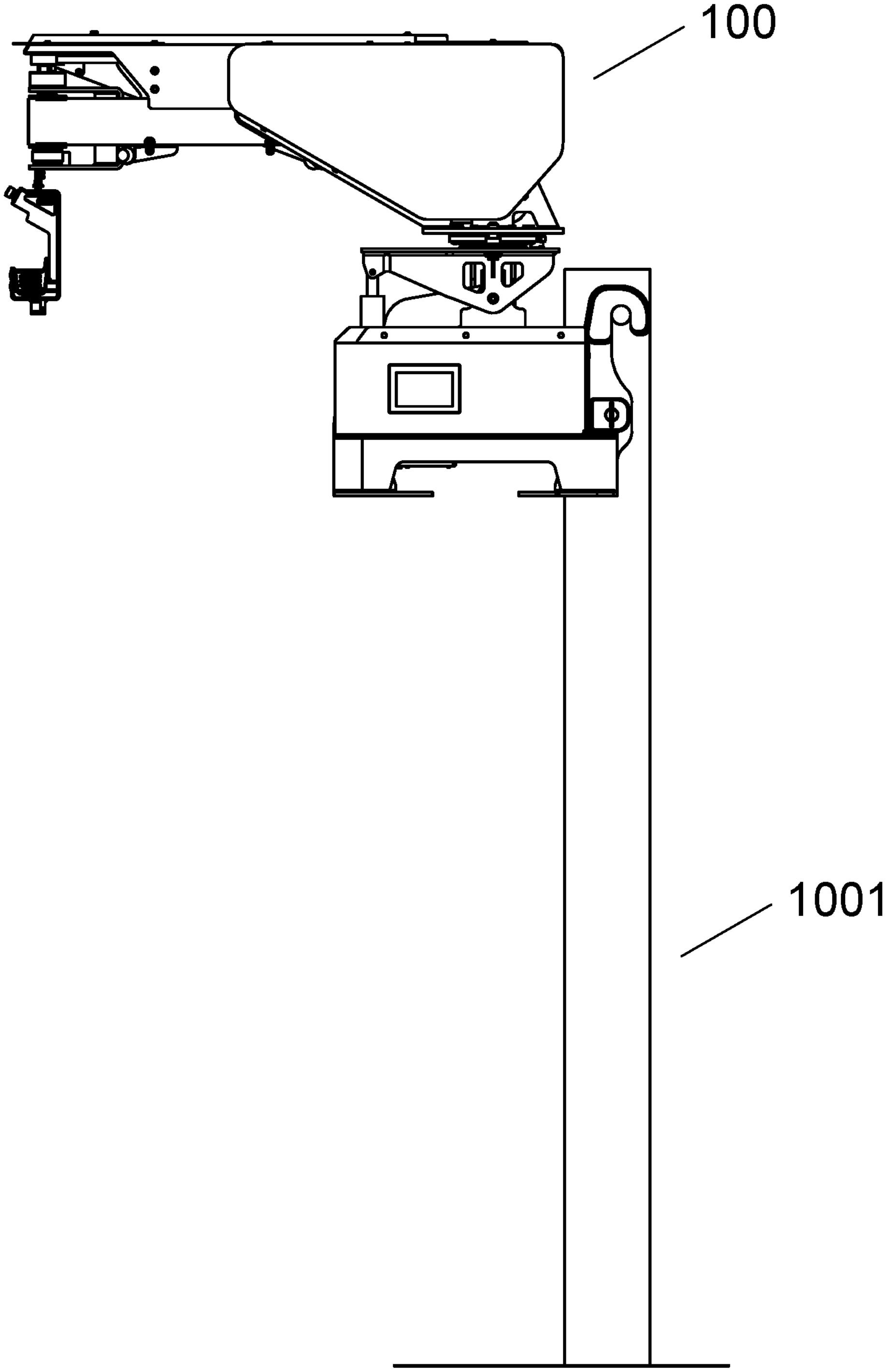
FIG. 10 depicts the enhanced lift assist device with a static base.

In some applications, the base may be static, as in the static base 1001 depicted in FIG. 10. The static base may be include, in some embodiments, a support post or column to increase the working height of the lift assist device. The mounting hooks 207 and 209 may be used to attach the lift assist device to the support column or post, or the base of the lift assist device may be bolted, welded, or otherwise attached to a static or a dynamic base. In some applications a static mount may be employed on a moveable super structure, resulting in an application where a static base may become a dynamic base.

Figure 11:
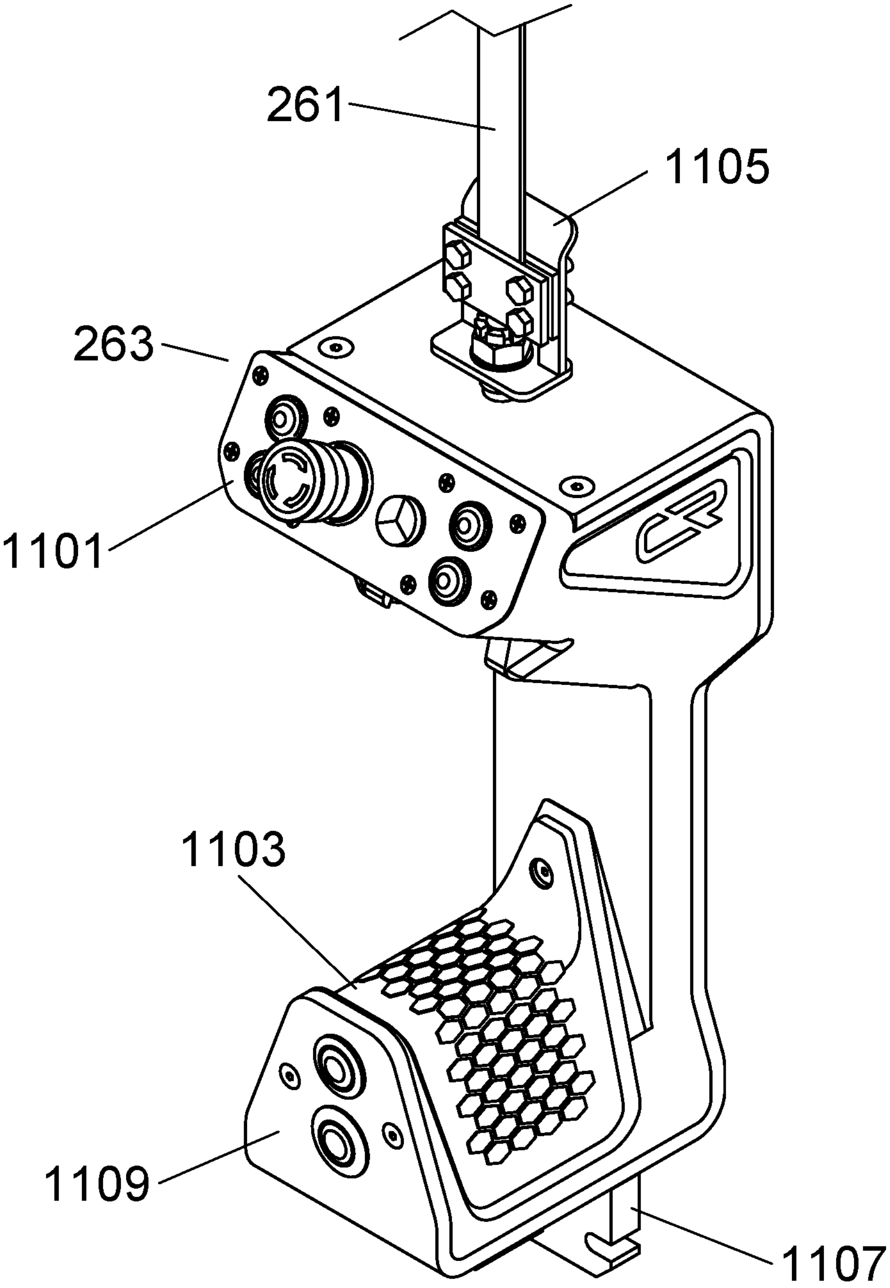
FIG. 11 is a perspective view of the control handle of the enhanced lift assist device.

While the lift assist device of the present invention is force based, where force applied by the user may be amplified or otherwise increased to provide lift and movement assistance, a control handle 263 (see FIG. 2) provides a point of user interaction along with additional functionality. FIG. 11 is a perspective view of the control handle 263 of the lift assist device showing attachment to a lifting element 261 such as a belt. A belt attachment 1105 provides structural retention of the lifting element 261 to the control handle 263, and may also, in some embodiments, serve to provide electrical power or electrical signals to the control handle 263 and other related components. The belt attachment 1105 is preferably made from a metal such as steel or aluminum, and may contain a swivel or rotational mechanism to allow the control handle 263 to move about a vertical axis while in use. The belt attachment 1105 may fasten the control handle 263 to the lifting element 261 by way of a compression or pressure fitting, bolts, clamps, linkages, pins, or the like. The control handle 263 has a first controls section 1101 that provides visual indicators of operational status, as well as an emergency off switch. In some embodiments of the present invention the control handle may not be attached to the lifting element, and instead act as a remote control point for the user with no structural significance.

An operator interface 1103 can be seen incorporated with or otherwise a part of the control handle 263. The operator interface 1103 may be configured as a hand or palm rest, or may otherwise support, retain or receive a user's hand or a portion thereof. The operator interface 1103 may, in some embodiments, be padded, and allows a user to move the control handle 263 while in use. In some embodiments, this handle may directly measure user input force to be used within the controls methodology of the invention. A tool connector 1107 can be seen attached to the control handle 263. The tool connector is made from a material such as a metal, and may contain features such as slots or holes to receive or engage with a tool. One can see an example of a tool in FIG. 18 where a hook tool 1801 is depicted. Other tools may be employed with the control handle 263. A variety of tools provides flexibility and a range of applications for the lift assist device of the present invention.

The control handle may contain multiple controls sections to better suit the user. For example, a second controls section 1109 may also be present with the control handle 263 of the present invention. The second controls section 1109 may contain further functionality, indicators, and the like, and is located adjacent to or otherwise connected with the operator interlace 1103.

Figure 12:
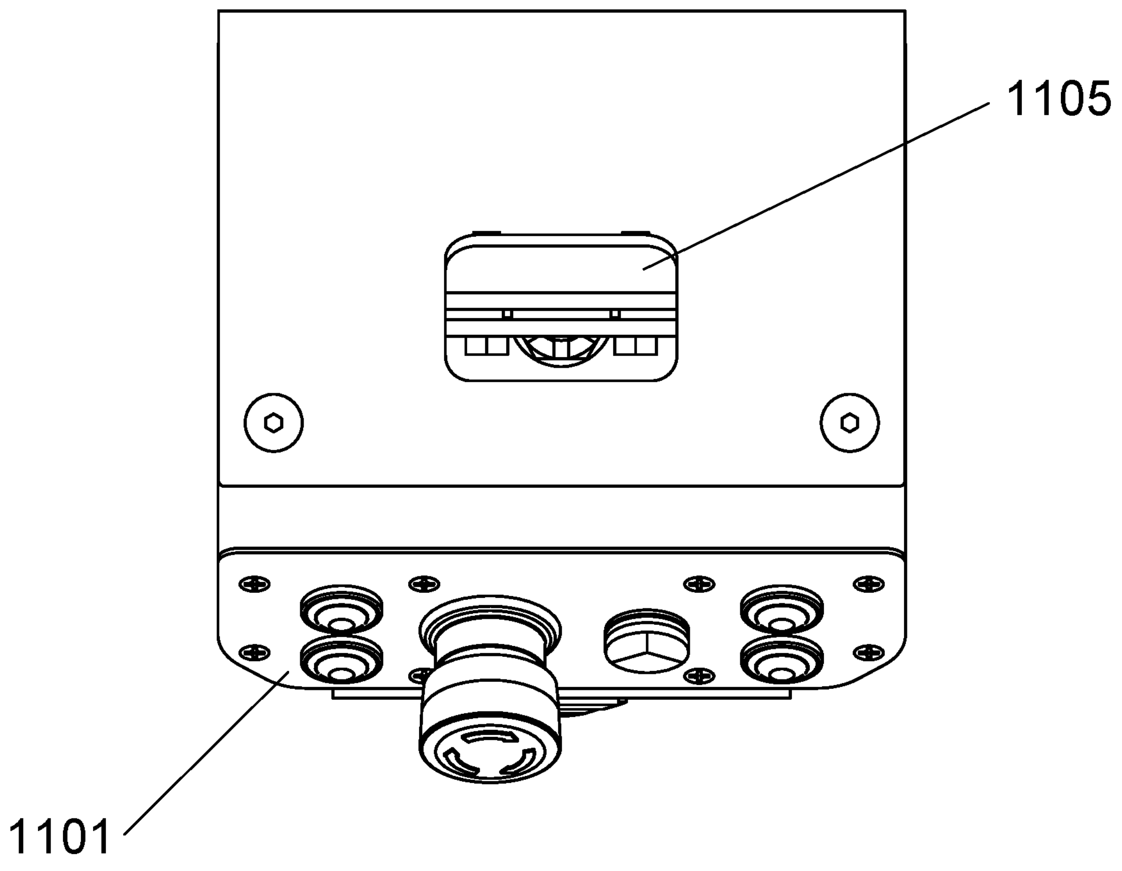
FIG. 12 is top plan view of the control handle of FIG. 11.

FIG. 12 is top plan view of the control handle 263 showing the belt attachment 1105. Should a lifting element other than a belt be used, the attachment 1105 will be modified accordingly to retain and secure that lifting element.

Figure 13:
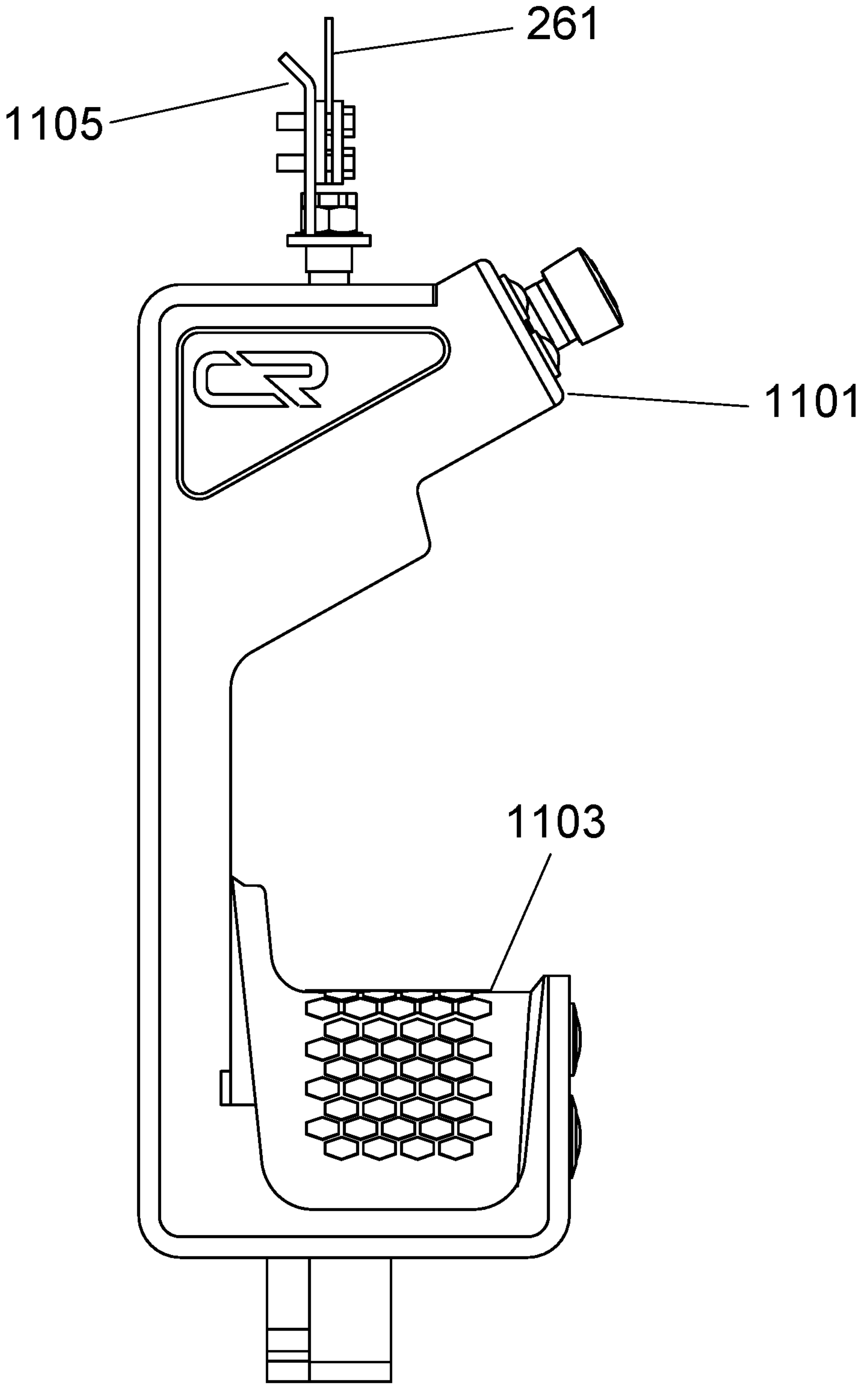
FIG. 13 is a side plan view of the control handle of FIG. 11.

FIG. 13 is a side plan view of the control handle 263 showing the operator interface 1103 and the overall form of the control handle 263.

Figure 14:
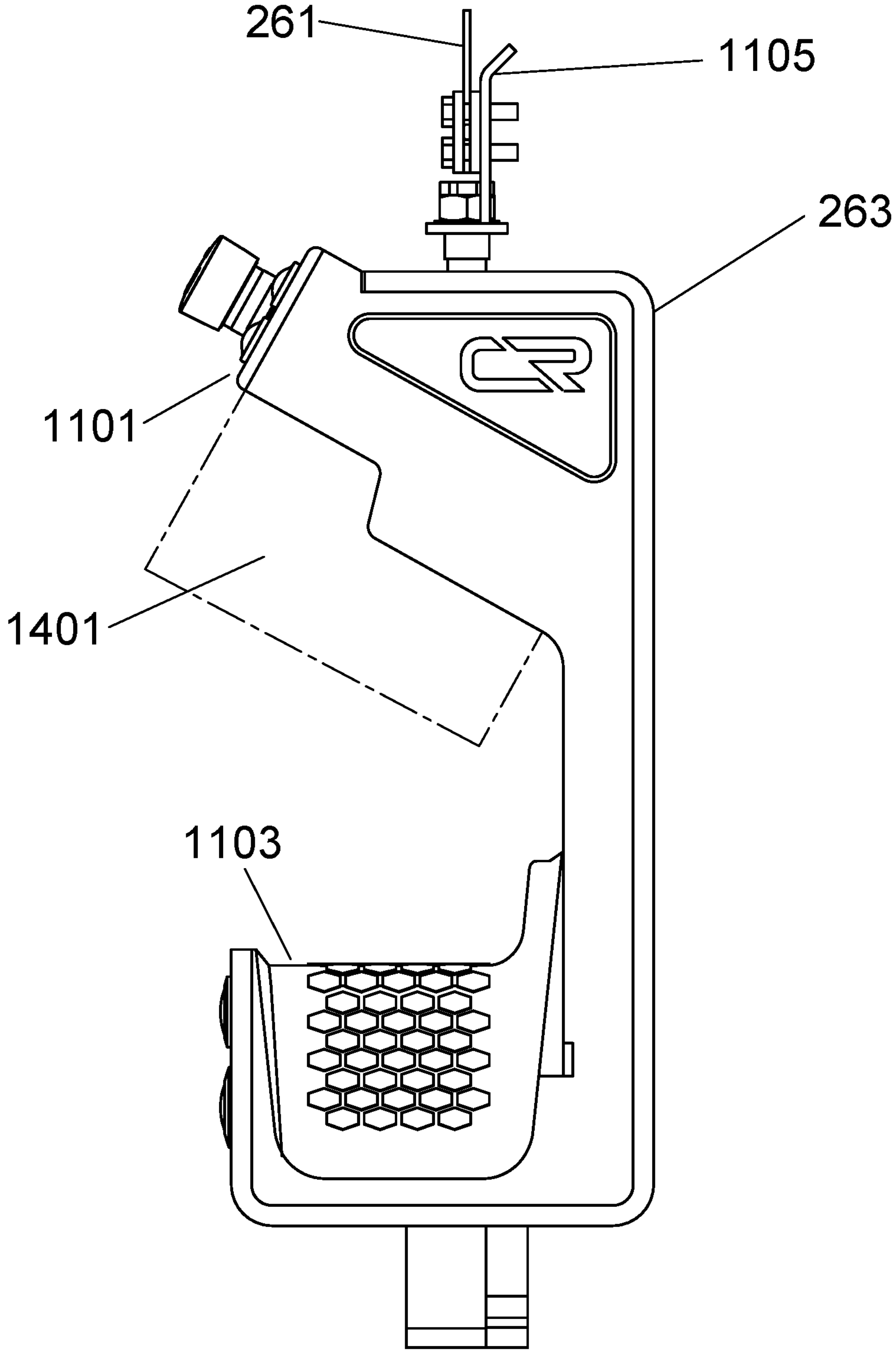
FIG. 14 is an alternate side plan view of the control handle of FIG. 11.

FIG. 14 is an alternate side plan view of the control handle 263 also showing the operator interface 1103 and the overall form and geometry of the operator interface 1103. It should be noted that in some embodiments of the present invention, a rechargeable battery pack 1401 may be removably coupled to the control handle 263. This allows the rechargeable battery pack to power the control handle 263, and be removed for charging as necessary. A user may also maintain multiple rechargeable battery packs to maintain continuity of operation.

Figure 15:
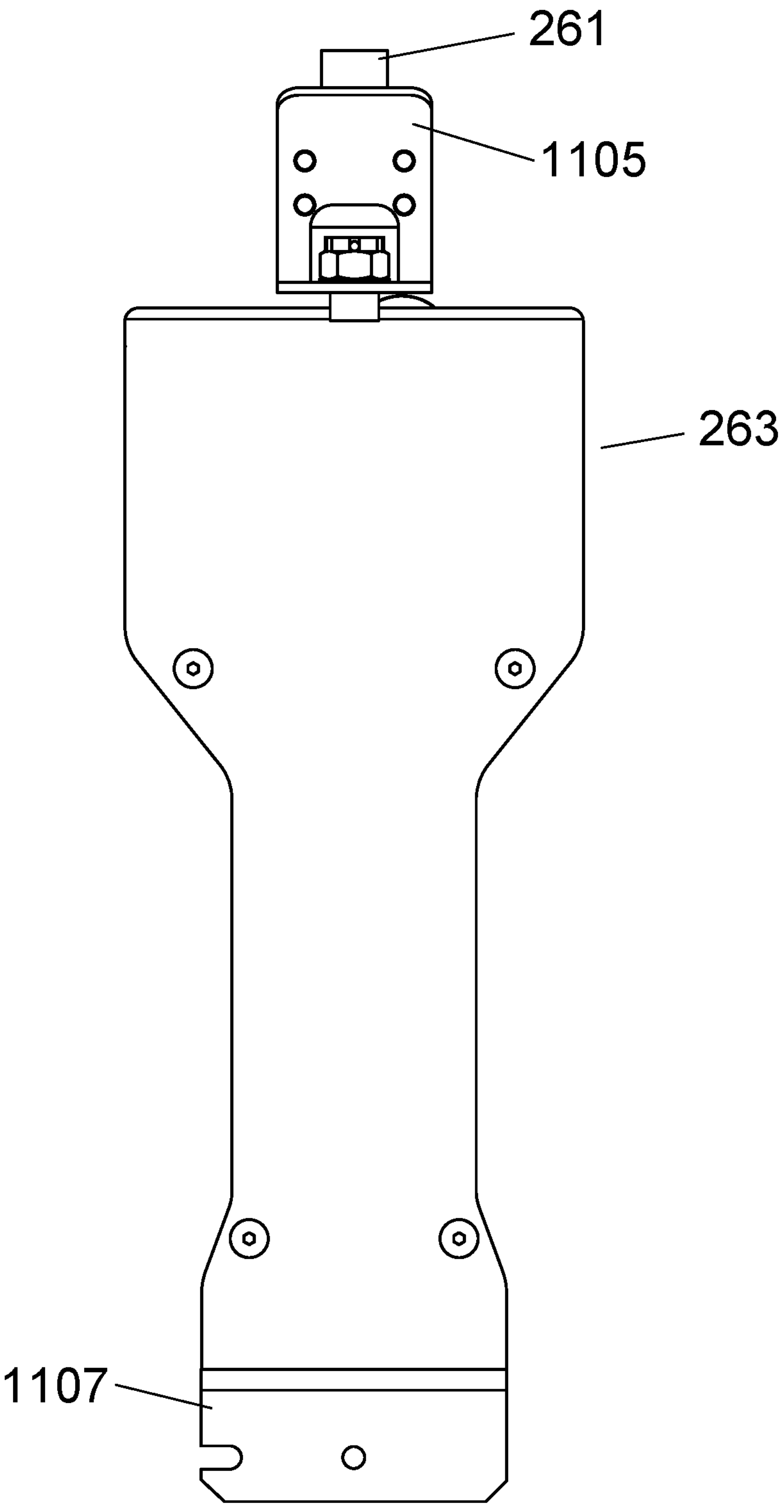
FIG. 15 is a back plan view of the control handle of FIG. 11.

FIG. 15 is a back plan view of the control handle 263 where the tool connector 1107 can be seen with a slot and pin connection arrangement. Many embodiments will include electrical connections within or in addition to the presented connector. Further connections may include, but are not limited to, pneumatic connectors, hydraulic connectors, and the like. Other connection geometries and features may be employed in further embodiments of the present invention. The belt attachment 1105 can also be seen connecting to a belt 261. The control handle 263 is a structural member, transferring the lifting load force from a connected tool (see FIG. 18) to the lifting element 261 (in this example a belt) by way of a belt attachment 1105.

Figure 16:
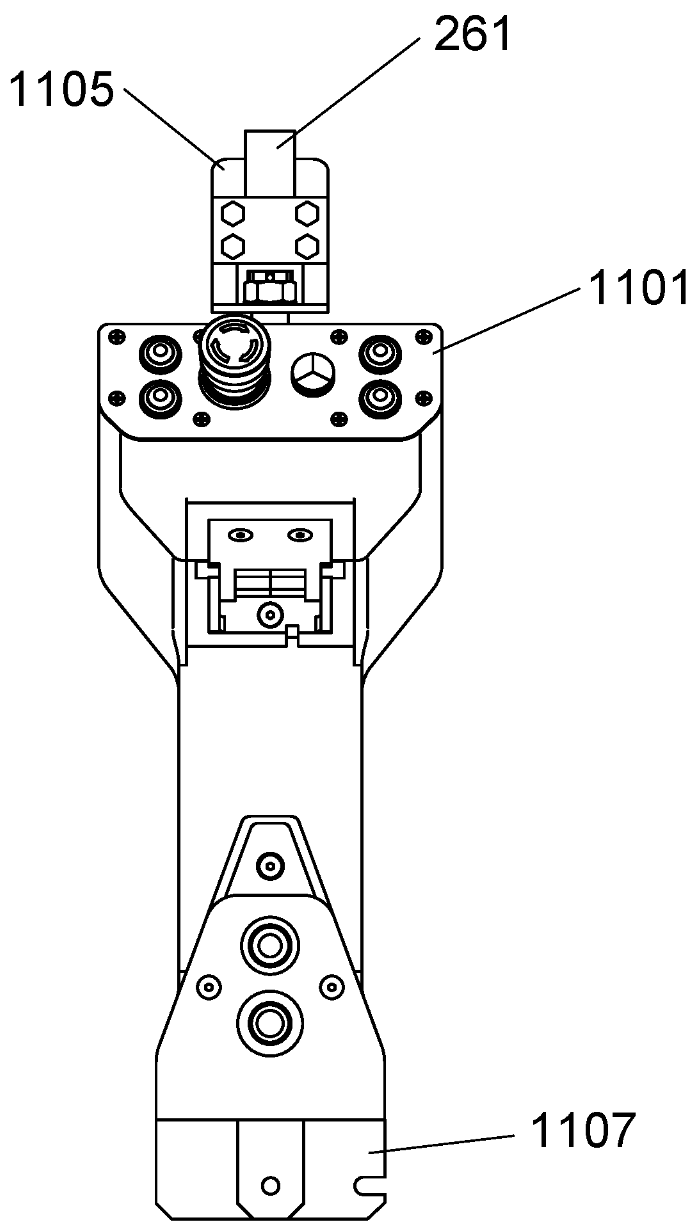
FIG. 16 is a front plan view of the control handle of FIG. 11.

FIG. 16 is a front plan view of the control handle 263 showing the first controls section 1101, as well as the belt attachment 1105, tool connector 1107 and the first controls section 1101.

Figure 17:
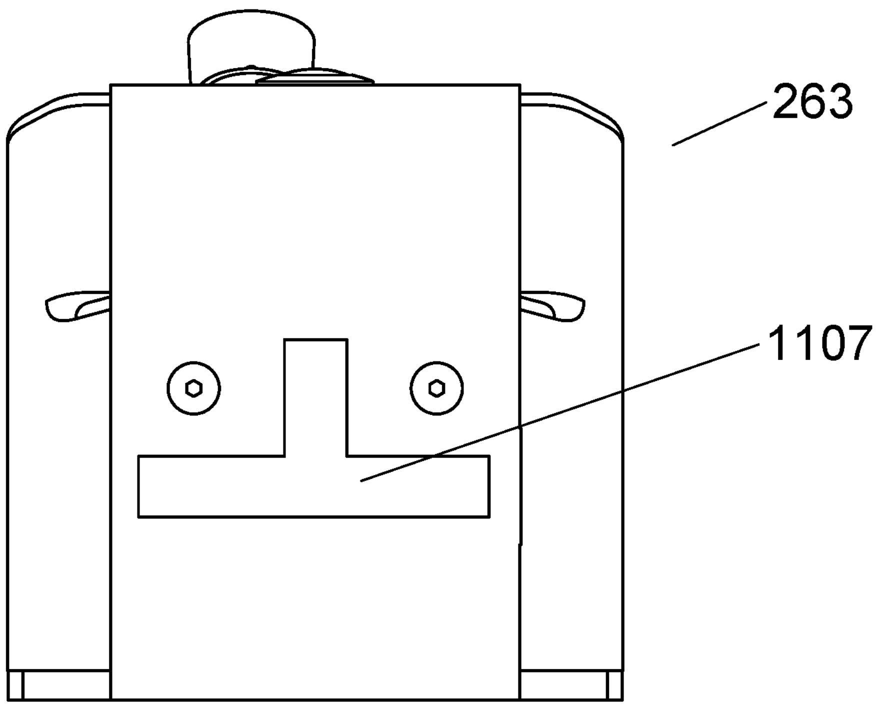
FIG. 17 is a bottom plan view of the control handle of FIG. 11.

FIG. 17 is a bottom plan view of the control handle 263 showing the tool connector 1107.

Figure 18:
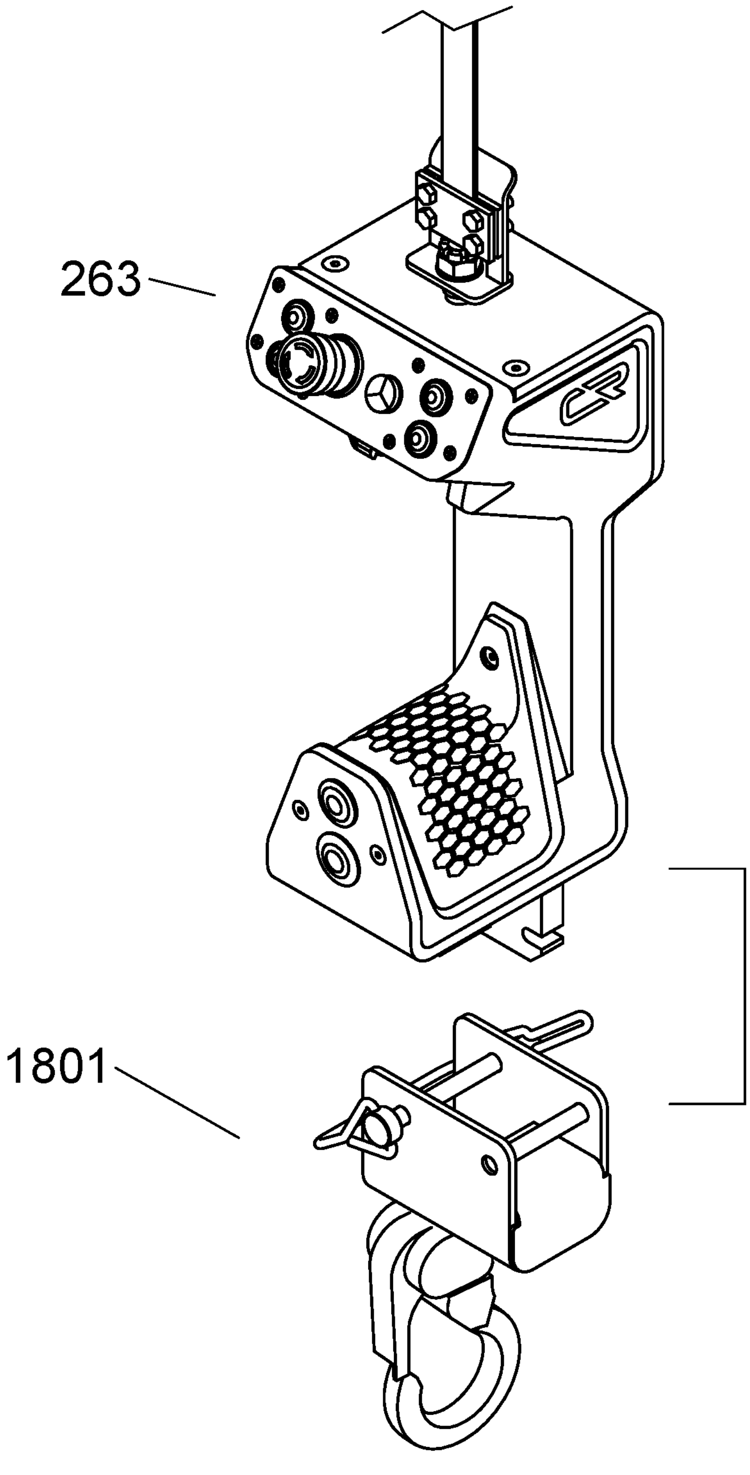
FIG. 18 depicts the handle with an example of a tool to be connected to the handle.

The ability to change tools can be seen in FIG. 18, where the control handle 263 is depicted with a hook tool 1801. A quick change coupling such as a fixed pin and a locking (removable) pin arrangement is used to facilitate rapid change out of tools during operation of the lift assist device. Additional geometry can be added or removed to better suit the needed degrees of freedom required for a given task. In some embodiments the application may not require changeable tools. In those instances the tool may be built-in/permanently installed to the control handle or fixed to the end of the lifting element.

Figure 19:
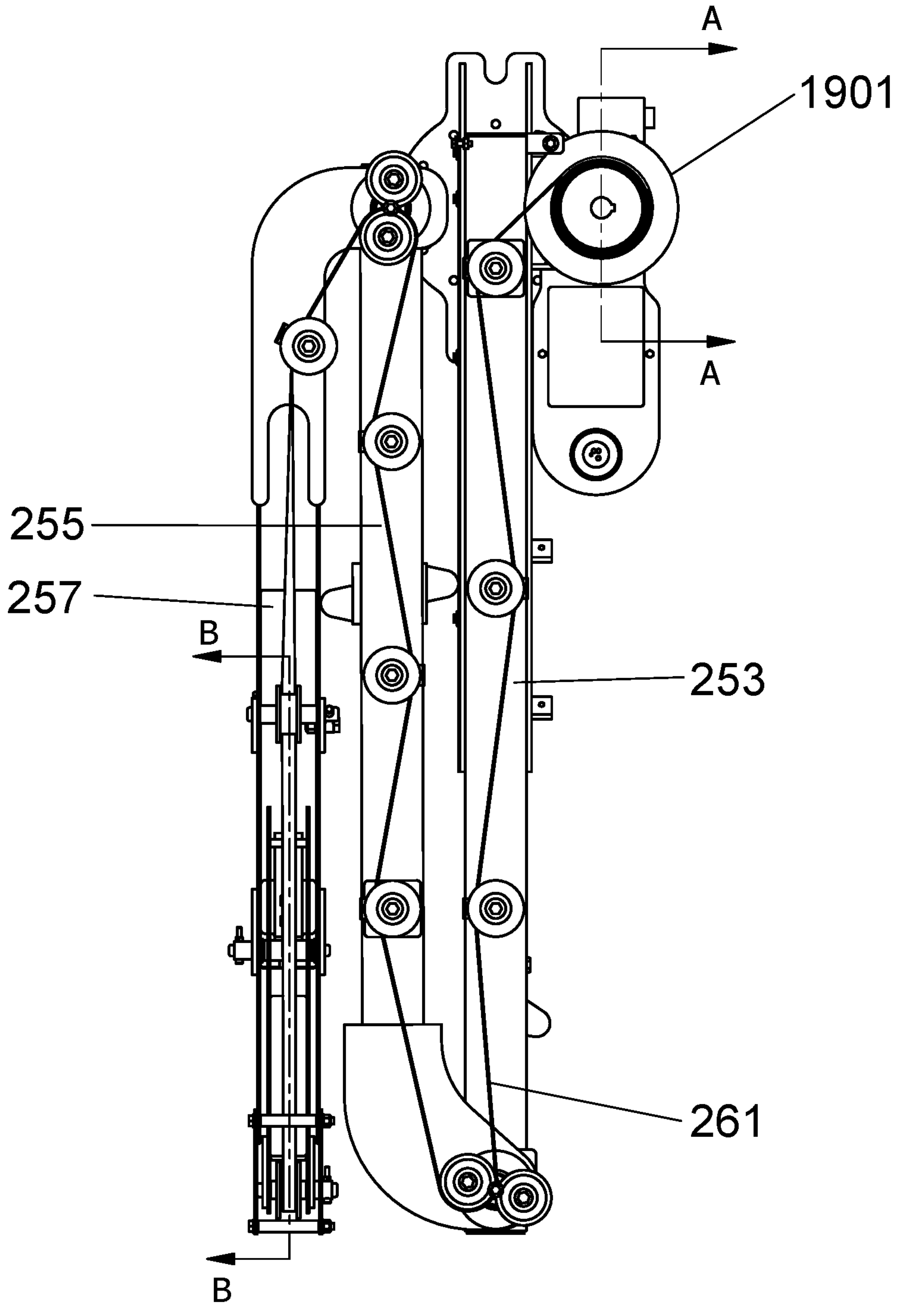
FIG. 19 is a top plan view of the articulating arm assembly with the covers removed.

FIG. 19 is a top plan view of the articulating arm assembly (103 in FIG. 1) with the covers removed. The first arm 253, the second arm 255 and the third arm 257 can be seen moveably coupled and containing a plurality of pulleys to guide the lifting element 261. The guide path of the lifting element 261 is defined by the pulley layout depicted. The lifting element 261 is wound on a drum 1901 that is in turn driven by a motor such as an electric motor with associated motor control circuitry. While a drum and drive motor arrangement arc depicted, other variable displacement mechanisms such as a spool and motor assembly, geared drive trains, and the like may also be employed. As seen in FIGS. 19-22, the lifting element 261 is singularly stacked or wound, as further depicted in the cross section A-A shown in FIG. 20. This singularly stacked arrangement provides a greatly simplified retention and drive setup over a side by side level wind mechanism, such as the mechanism to found with a cable and cable spool setup. In some embodiments, the drum is not grooved or channeled to allow the lifting element to wrap upon itself, layer on layer. This single stack or layering of the belt based lilting element upon the drum allows for efficient and trouble free operation. Turning again to FIG. 19, at each joint where one articulating arm is moveably coupled to another articulating arm, a travel pulley and a guide pulley can be seen mounted to a rotational plate or disc. This allows the belt position to move with articulation of the arms. As the lifting element 261 exits the third arm 257, a force sensing arrangement is used to determine user applied force. This measurement can then be considered along with the other inputs to the system to determine the outputs to be applied by way of a drive motor coupled to the drum 1901. This force sensing arrangement is depicted in FIG. 22 (which is a cross sectional view along line B-B in FIG. 19). In some embodiments force sensing is instead done at a different location within the lifting element path, for example at either end of the lifting element or within the structural support structure of the system.

Figure 20:
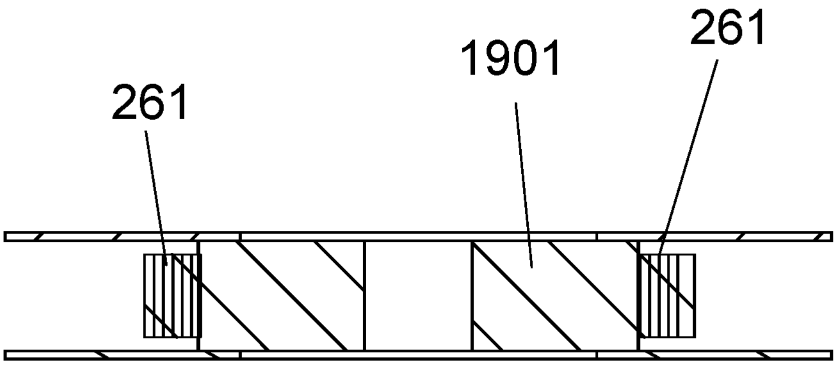
FIG. 20 is a cross sectional view of the drum taken along line A-A of FIG. 19.

FIG. 20 is a cross sectional view of the drum taken along line A-A of FIG. 19. The drum 1901 can be seen with the lifting element 261 wound as a single stack thereupon.

Figure 21:
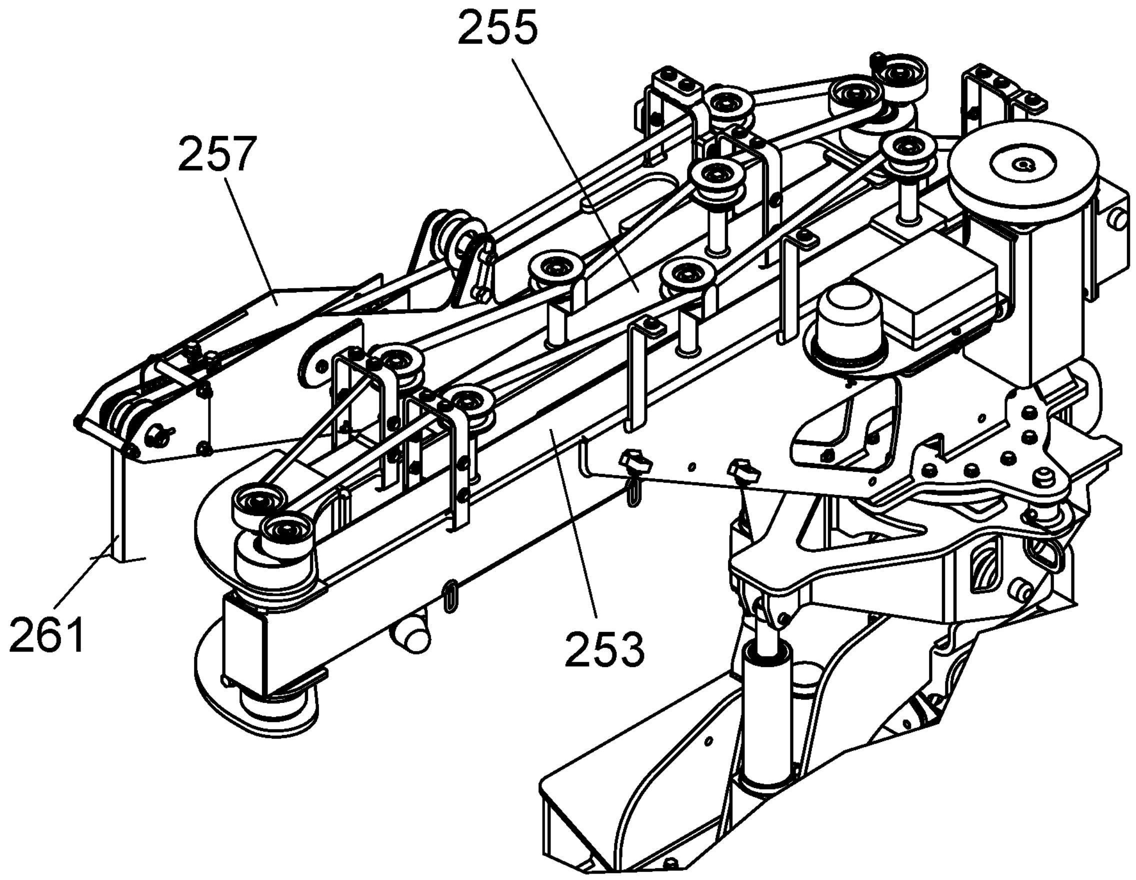
FIG. 21 is a perspective view of the upper portion of the enhanced lift assist device with the covers removed.
Figure 22:
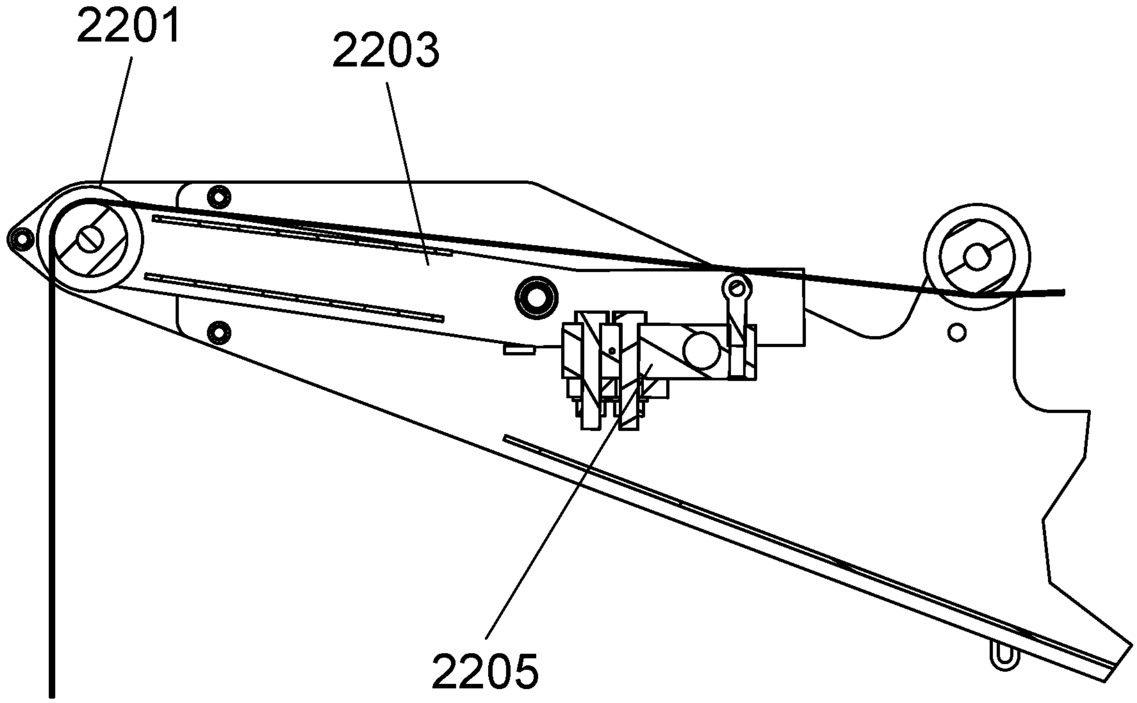
FIG. 22 is a cross sectional view of the third arm taken along line B-B of FIG. 19.

FIG. 21 is a perspective view of the articulating arm assembly with the covers removed. Again, the lifting element 261 can be seen with its travel path defined by the pulleys depicted.

In some embodiments of the present invention, belt position (lifting element) mapping is employed. There is a software based teaching procedure on installation that always tracks the belt while in motion. Measurement of the effective radius of the drum as the belt spools on top of itself directly correlates to the speed of the belt and the torque to required by the motor. The sensors used in these measurements may be absolute (such as absolute encoders) or relative (such as an incremental encoder with a homing switch). The tracking of the effective radius of the drum is required for accurate control of position, velocity, acceleration and force.

In some embodiments, it is critical for the machine to know how much of the lifting element is spooled on the drum at all times. This provides two variables used for machine control: effective drum radius and position tracking.

In some operational modes the Enhanced Lift Assist Device performs automated sequences where speed control is important. Without knowledge of the effective drum diameter the machine would have no way of deciding how fast the motor should turn to maintain the commanded speed. This effective radius (drum diameter) is also important when monitoring motor torque as a method to then monitor force. In other devices that effectively have a fixed drum radius (where the lifting element is spooled beside itself instead of stacking upon itself) this measurement would not be inherently required for controls purposes.

For operational safety it is critical that the Enhanced Lift Assist Device does not extend or retract the lifting element 261 too far. If the Enhanced Lift Assist Device were to retract too far, contact would occur between the arm assembly and the control handle. When the machine is running at a fixed speed this collision would cause the tension in the lifting element to drastically increase, possibly breaking the lifting element, causing the control handle to fall. Similarly if the lifting element were to extend too far, the lifting element could bend back over itself, permanently damaging the material and possibly breaking.

In order to maintain controllability with a changing drum radius and prevent over travel, sensor(s) with software logic may be employed to measure the movement of the lifting element. This may be done directly on the lifting element or instead done through the drivetrain of the titling element.

FIG. 22 is a cross sectional view of the third arm taken along line B-B of FIG. 19 showing the force sensing system of the present invention. A pulley 2201 can be seen translating generally horizontal displacement of the lifting element 261 to generally vertical displacement. The pulley 2201 is coupled to a rocker linkage 2203 that moves by way of a pin or rotational hinge such that a downward force applied to the lifting element 261 is in turn transferred to a force sensor 2205 by way of the rocker linkage 2203. The force sensor 2205 converts applied force into an analog signal (voltage or current) whose amplitude represents the applied force. This analog signal is in turn directed to an analog to digital converter where it is converted to a digital signal for further processing by the microcontroller or microprocessor. A force amplifier converts the user applied force received by the force sensor to a mechanical force applied to a tool such as a building element gripper by way of translating an analog signal from the force sensor to proportional power applied to the motor and drum arrangement that drives the lifting element 261.

Figure 23:
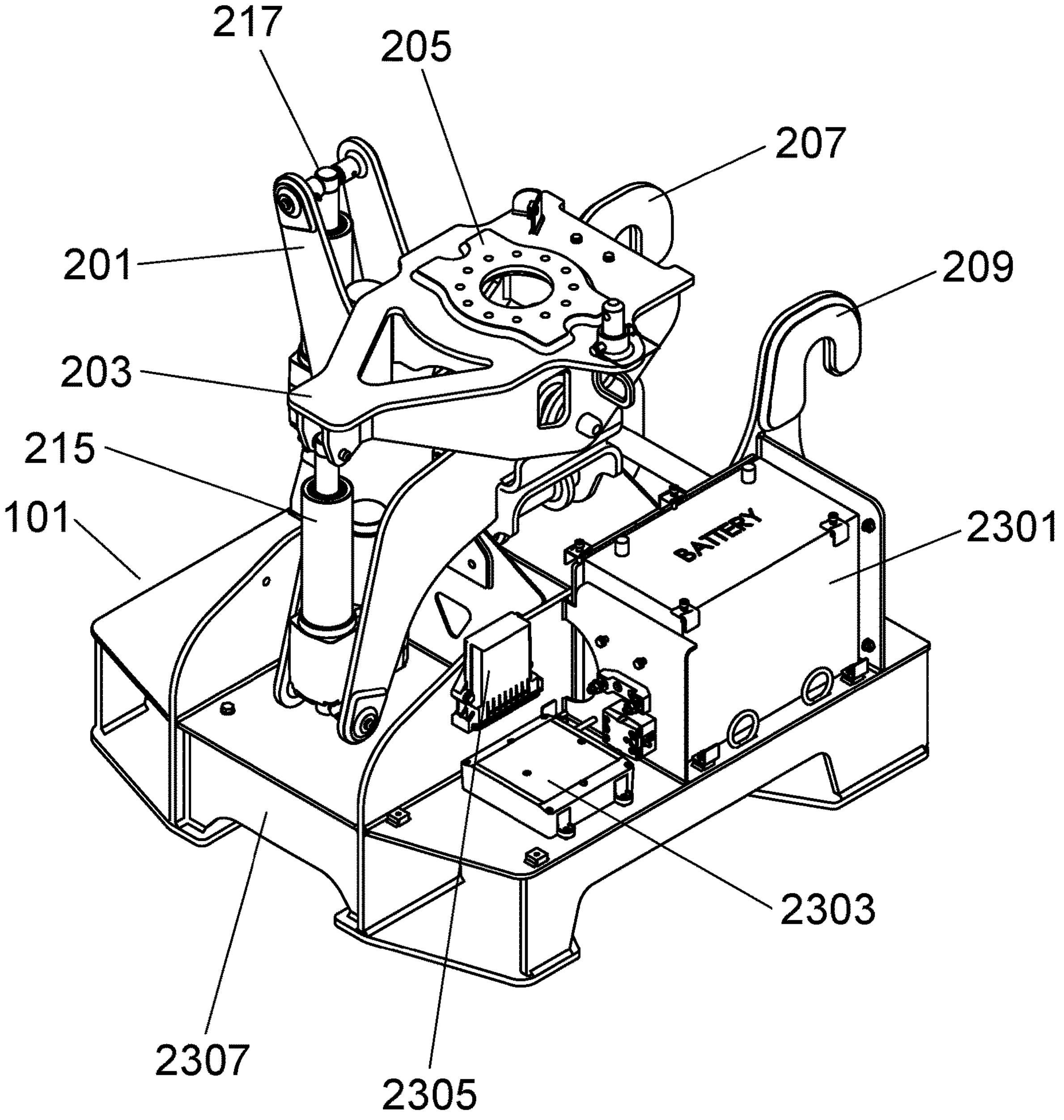
FIG. 23 is a perspective view of the adjustable base with the articulating arm assembly removed for clarity.

FIG. 23 is a perspective view of the self-leveling base with the articulating arm assembly removed for clarity. The housing 211 has been removed to show the various electrical components. A battery 2301 such as a lithium ion battery is used to power the lift assist device. The battery 2301 is preferably rechargeable and may comprise any of a variety of battery technologies and chemistries suitable for the present invention and the various embodiments described herein. A charge controller 2303 can be seen that provides proper battery charging profiles, safety interlocks and shutoffs, current control and current limit functionality, and the necessary power management circuitry. A logic controller 2305 can also be seen that contains the microprocessor(s)/microcontroller(s) as well as related logic and power circuit components. The controller 2305 manages and processes inputs from level sensors, motors, actuators, and the like, and provides drive control for the drum motor and electric actuators. In some embodiments, the logic controller and associated electronics have external connectivity technologies built-in such as Bluetooth, Wi-Fi and cellular. This connectivity can be used to transfer data to/from the machine and the internet for enhanced machine monitoring and maintenance. An onboard GPS may also be incorporated to allow for knowledge of location of the machine. A base substructure 2307 can also be seen to provide mechanical integrity to the self-leveling base.

Figure 24:
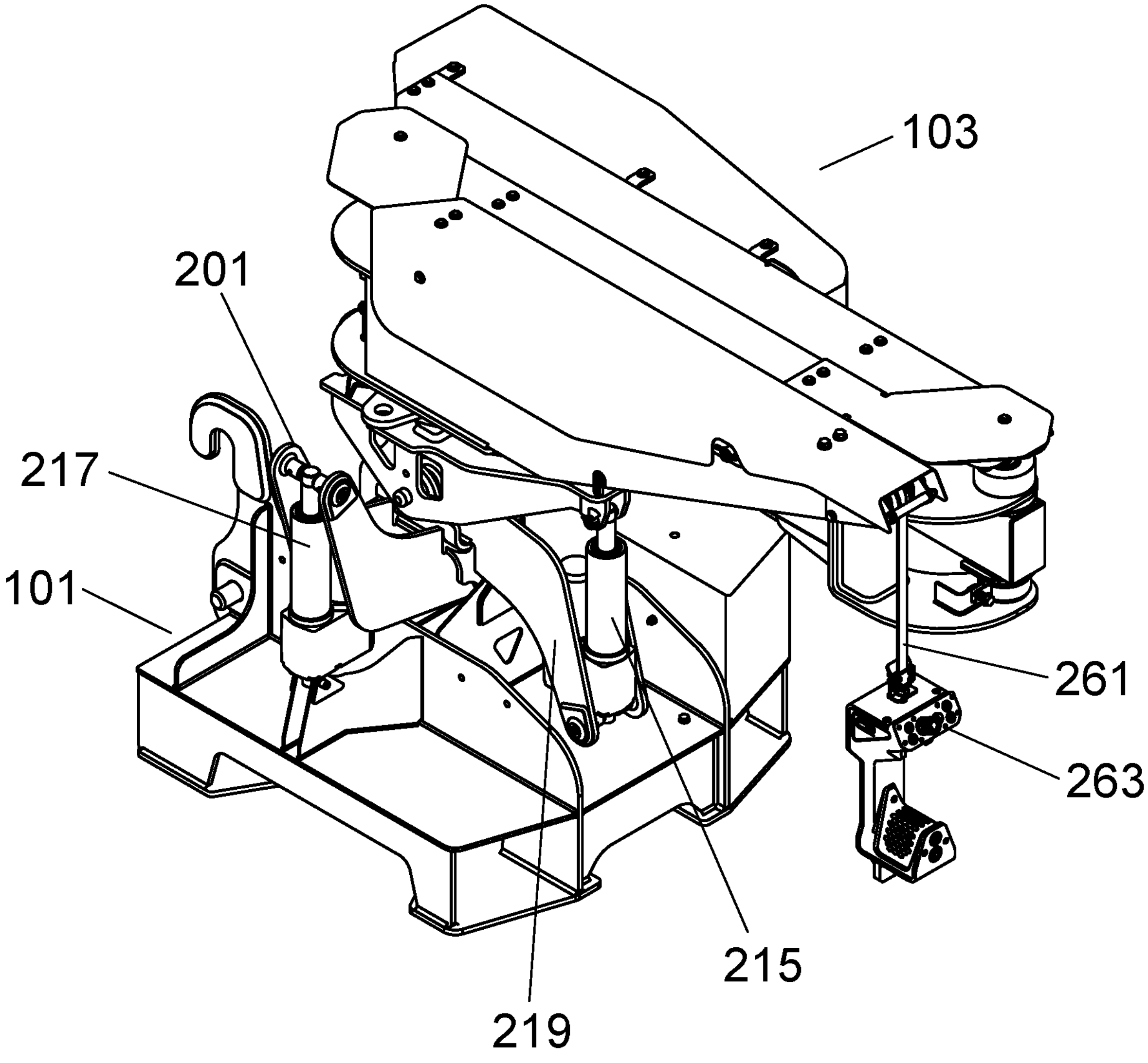
FIG. 24 is an alternate perspective view of the enhanced lift assist device.

FIG. 24 is an alternate perspective view of the lift assist device. The lifting element 261 can be clearly seen attached to the control handle 263 with the arms in a retracted position.

Figure 25:
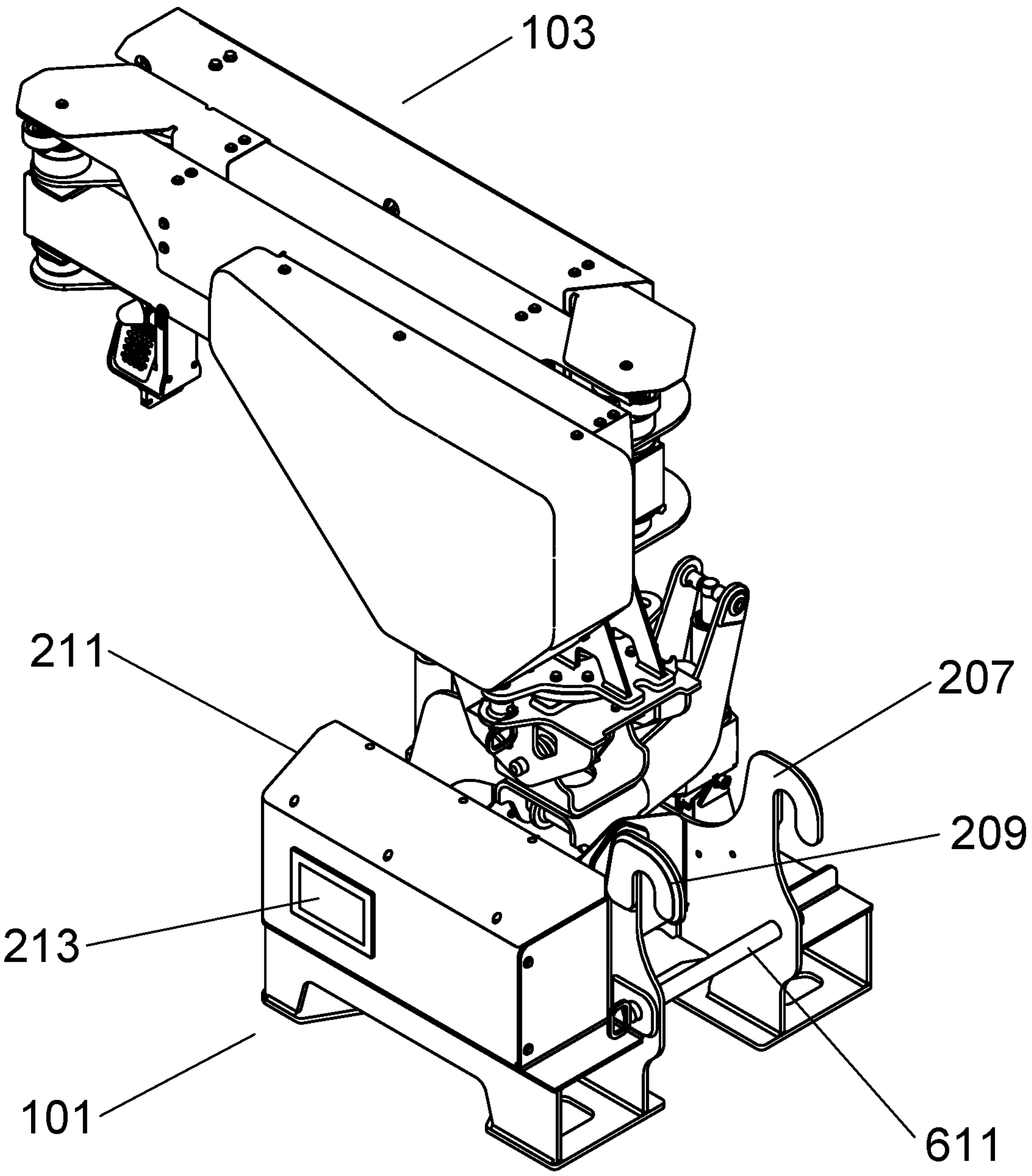
FIG. 25 is a rotated perspective view of the enhanced lift assist device.

FIG. 25 is a rotated perspective view of the lift assist device showing the arms in a collapsed, possibly a storage, position.

Figure 26:
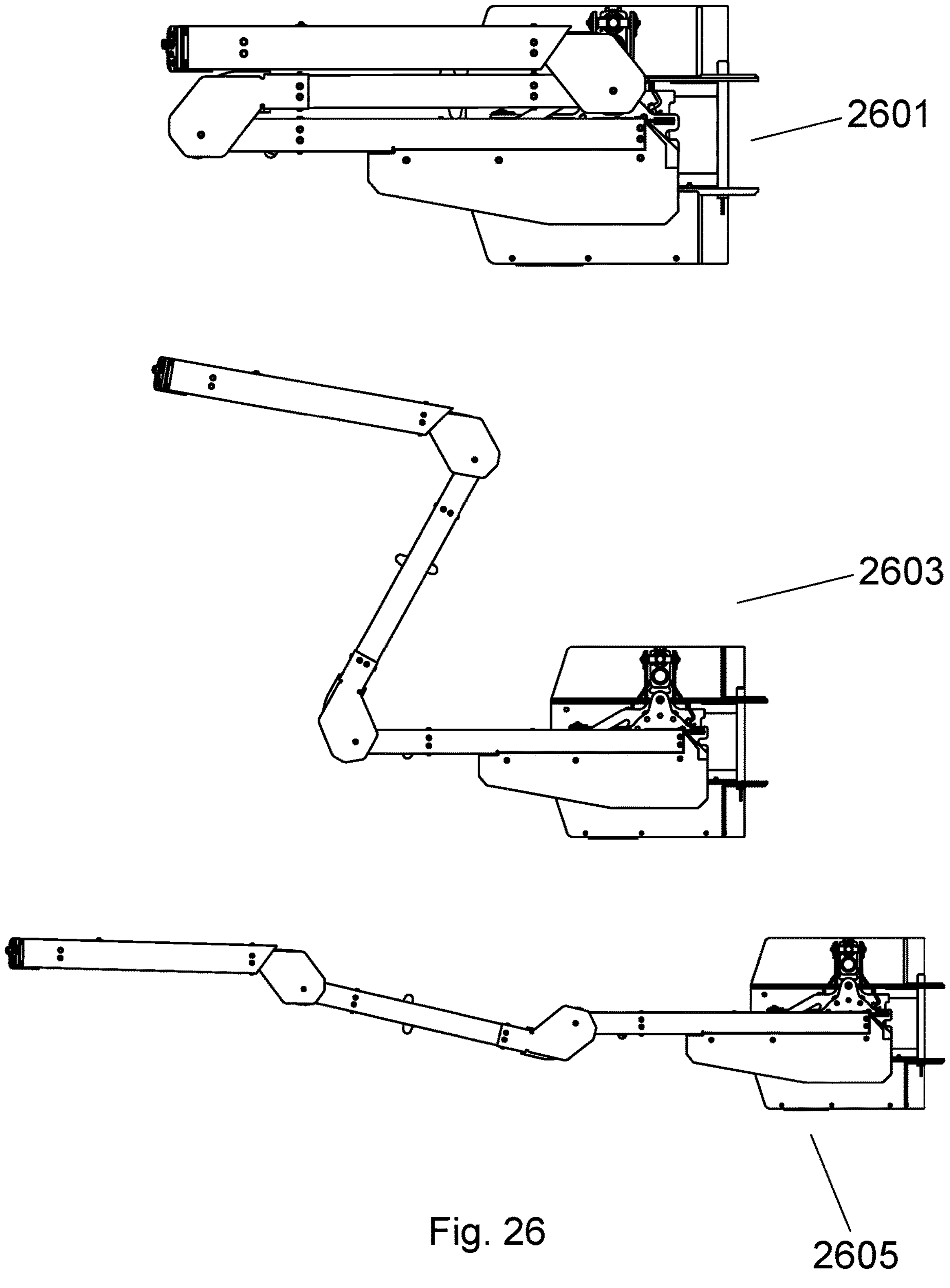
FIG. 26 depicts the articulating arm of the enhanced lift assist device in various states.

To illustrate the range of movement possible with the lift assist device of the present invention. FIG. 26 depicts the lift assist device in various states. 2601 depicts a stowed or storage position. 2603 depicts an operating or partially extended position, and 2605 depicts a fully extended operating position.

To fully understand the present invention and the various embodiments described, depicted and envisioned herein, several flowcharts of the underlying software-hardware control are provided.

Figure 27:
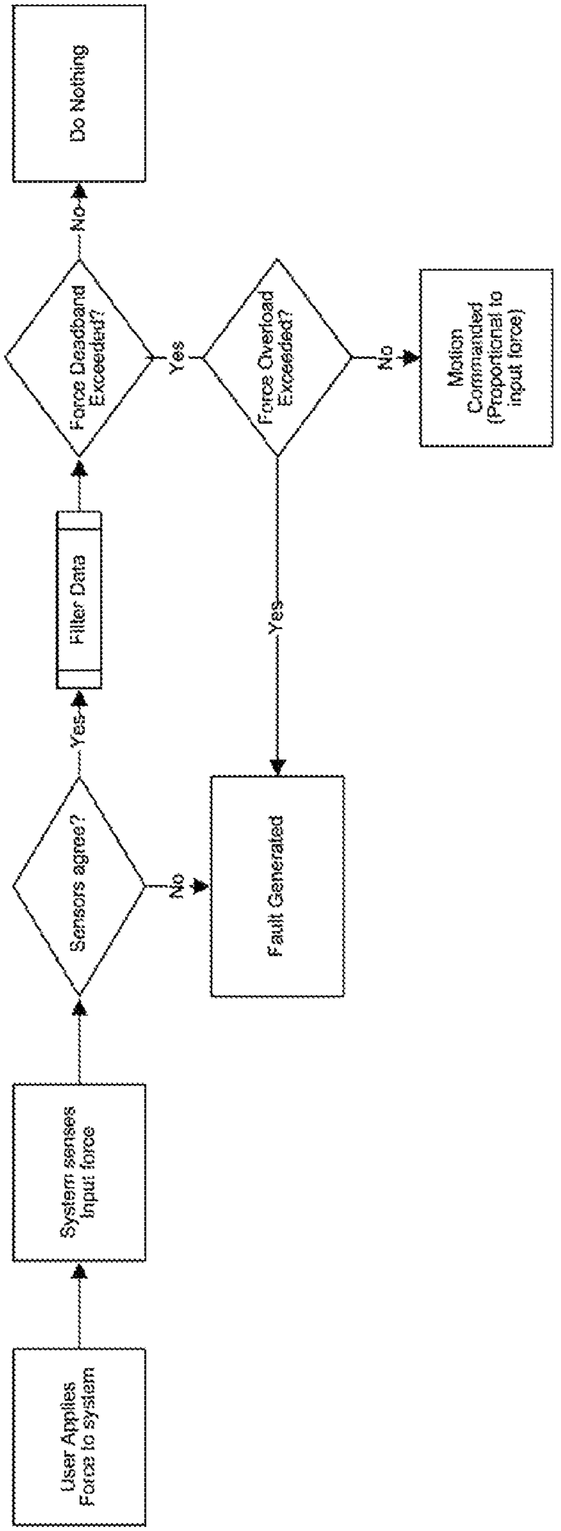
FIG. 27 is a flowchart depicting force sensing and command steps.

FIG. 27 is a flowchart depicting force sensing and command steps for the operational mode within an embodiment of the present invention. As previously stated, the Enhanced Lilt Assist Device can provide lift and motion assistance that is proportional to the force a user applies to the handle (which is in turn, by way of a connected tool, attached to an item to be moved). The force sensing, as previously described, occurs by way of a load cell or force sensor. Force sensing may also be performed by monitoring current used by the drive motor. There may be more than one sensor for redundancy or safety. There may also be a defined deadband where if the user applied force is within that deadband, there is no lift or motion assist. The force deadband must be exceeded in order for lift or motion assistance to occur.

For the Enhanced Lift Assist Device to be considered safe within governmental and industry regulations, it may be designed and built with certain redundancies to protect the user of the Enhanced Lift Assist Device. In these cases it may be required that dual sensors be used for critical measurements (such as force sensing) and that the control electronics used can be trusted to properly control the machine. These dual sensors are often packaged within the same physical package (and thus in the same physical location on the Enhanced Lift Assist Device) but have independent measurement circuitry to increase the likelihood of valid measurements. Many of these physical packages will have error checking built-in such that any reading that is reported has been internally verified. In many cases, these control electronics will have fault detection integrally built in (sometimes into the microprocessor itself) to detect internal faults and handle them in a safe manner. This may be partially done through redundant calculations and code that has been fully tested.

Figure 28:
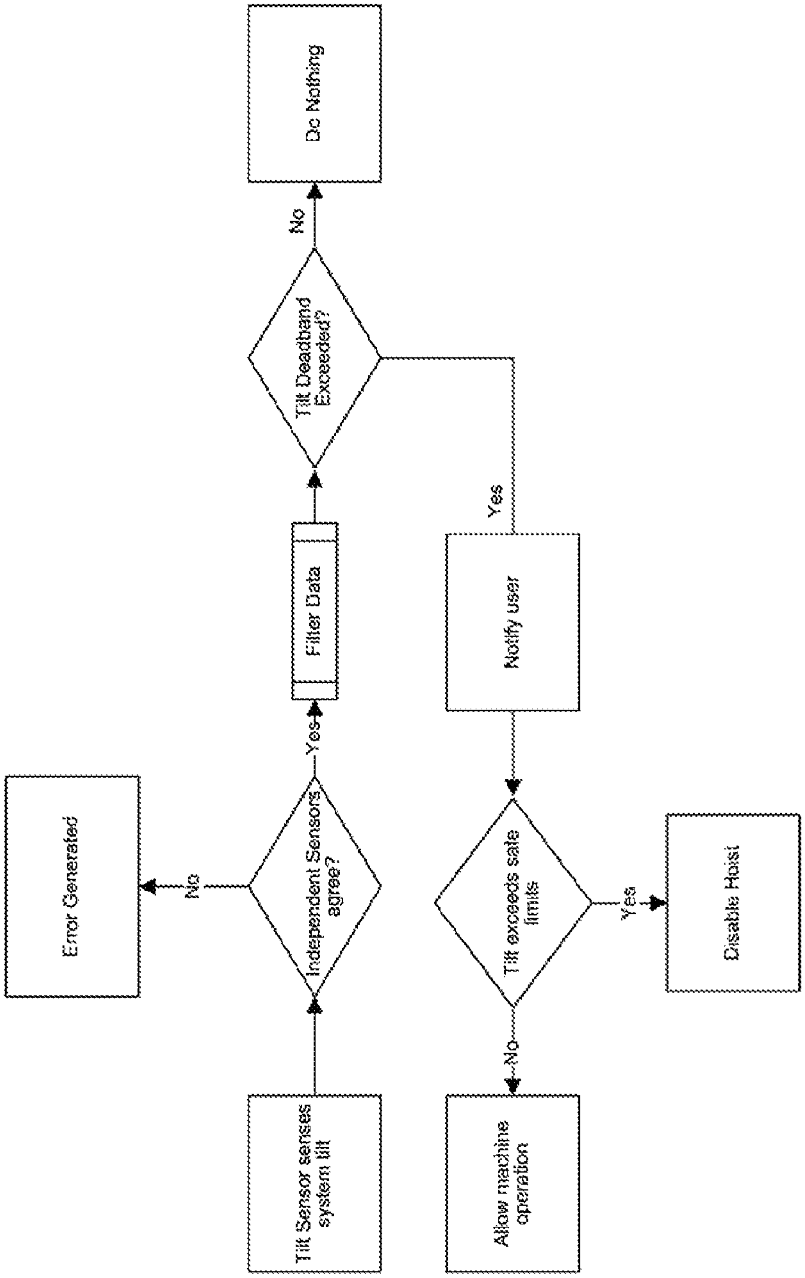
FIG. 28 is a flowchart depicting level sensing and machine response to system tilt.

FIG. 28 is a flowchart depicting level sensing and machine response to system tilt. In this flowchart, tilt safety limits are pre-programmed where the Enhanced Lift Assist Device is disabled if the tilt safety limits are exceeded.

Figure 29:
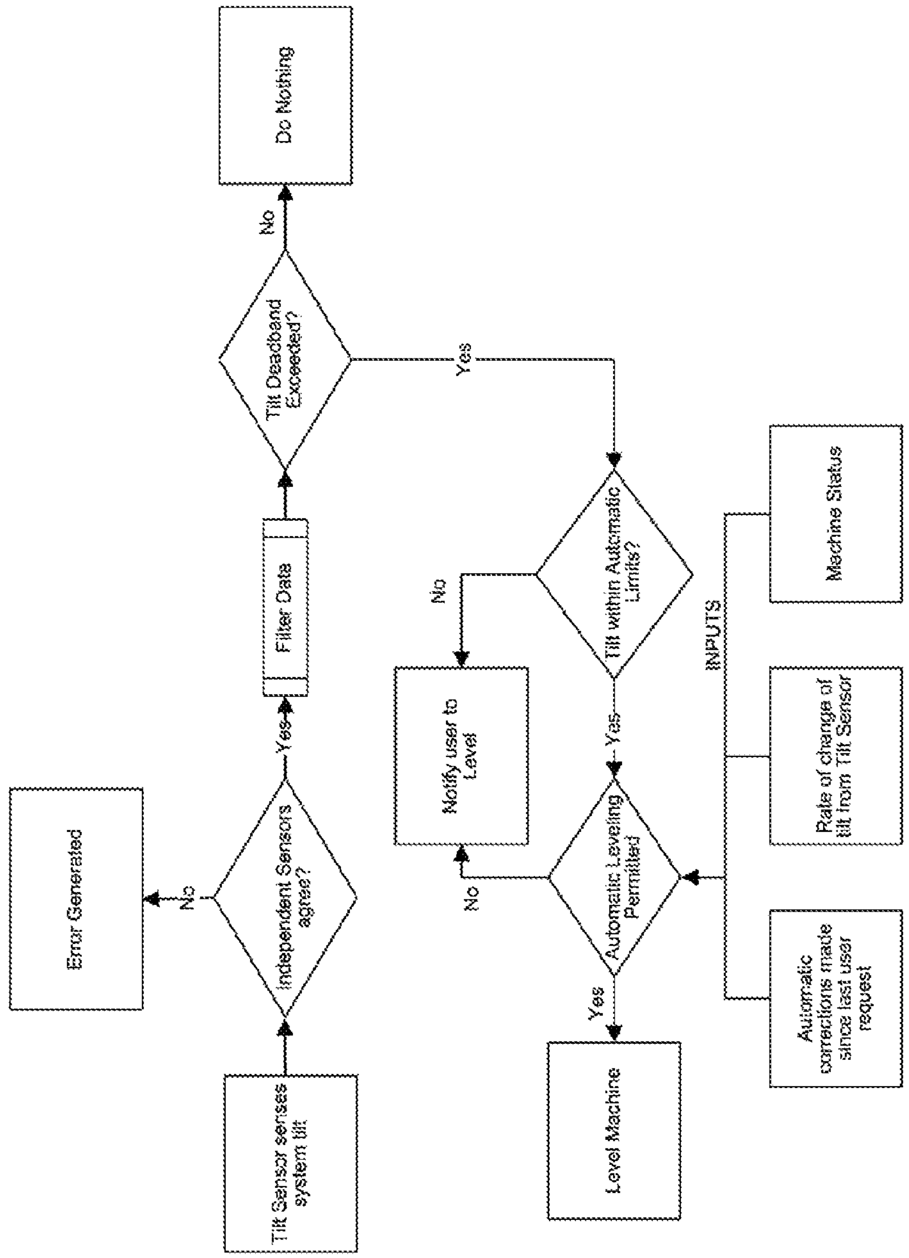
FIG. 29 is a flowchart depicting level sensing and automated level sequencing.

FIG. 29 is a flowchart depicting level sensing and automated level sequencing. This flowchart builds on the steps defined in FIG. 28, and further defines automatic limits for tilt where automatic leveling is permitted, and machine leveling occurs through activation of the two actuators 215 and 217. Tilt sensing through an electronic tilt sensor or electronic level provides control signals to an A/D converter that in turn activates machine auto leveling. In addition, the electronic level signals provide fault indicators, machine lockout, machine status, and the like.

Figure 30:
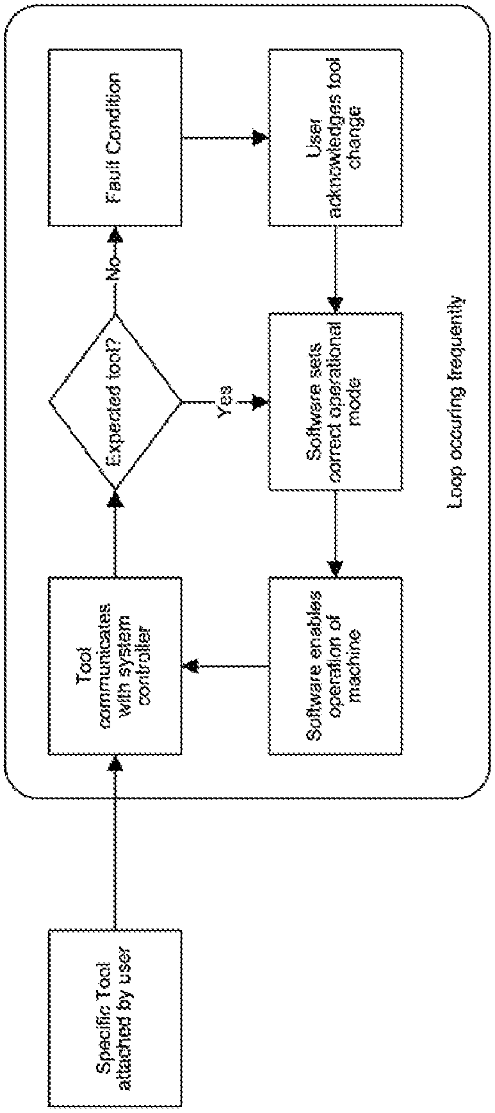
FIG. 30 is a flowchart depicting tool identification and operational modes.

FIG. 30 is a flowchart depicting tool identification and operational modes. As previously discussed by way of FIG. 18 and the related description, a variety of tools 1801 can be connected or otherwise coupled to the control handle 263. To facilitate proper control and response of an attached tool 1801, the tool may contain logic or memory circuits that interface and otherwise communicate with the control handle 263 when connected. This communication provides information about the tool to the control handle 263, creates fault conditions when certain criteria arc met, sets a correct operational mode, and otherwise enables operation and control of the Enhanced Lift Assist Device.

Figure 31:
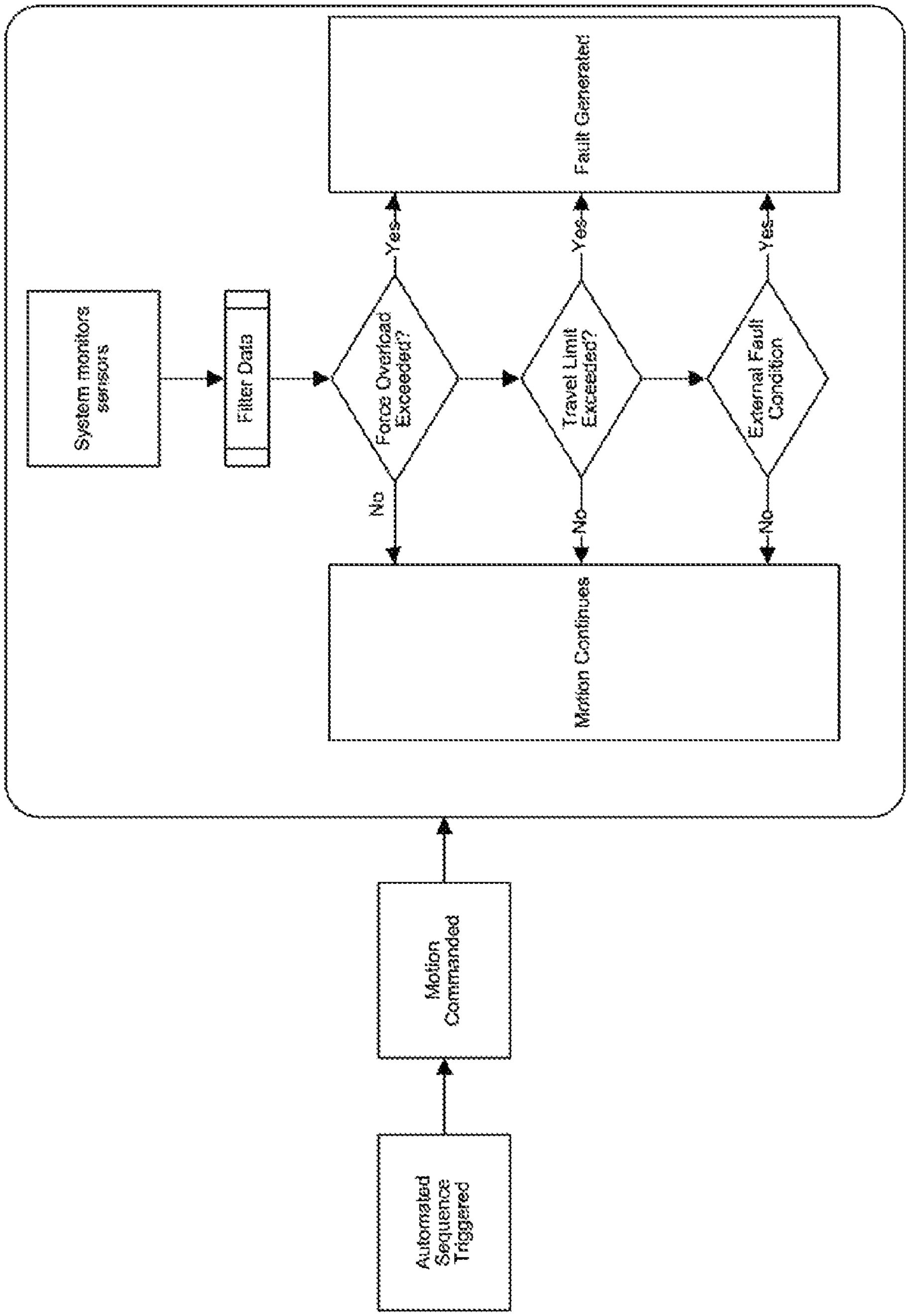
FIG. 31 is a flowchart depicting automated sequence flow of hoist or arms.

FIG. 31 is a flowchart depicting automated sequence flow of hoist or arms. In some operational modes of the present invention, the machine will perform an automated sequence of actions instead of responding to user input force. These automated motions could include, for example, automatically lifting after releasing a load, moving the arm to a "home" position, or any other sequence that is useful to a user of the Enhanced Lift Assist Device. During this command and activation sequence, the force being applied to the item is monitored for an overload condition. In addition, travel of all motion axes are monitored through a series of sensors. Should a dangerous condition occur, a fault is generated to stop machine motion.

Figure 32:
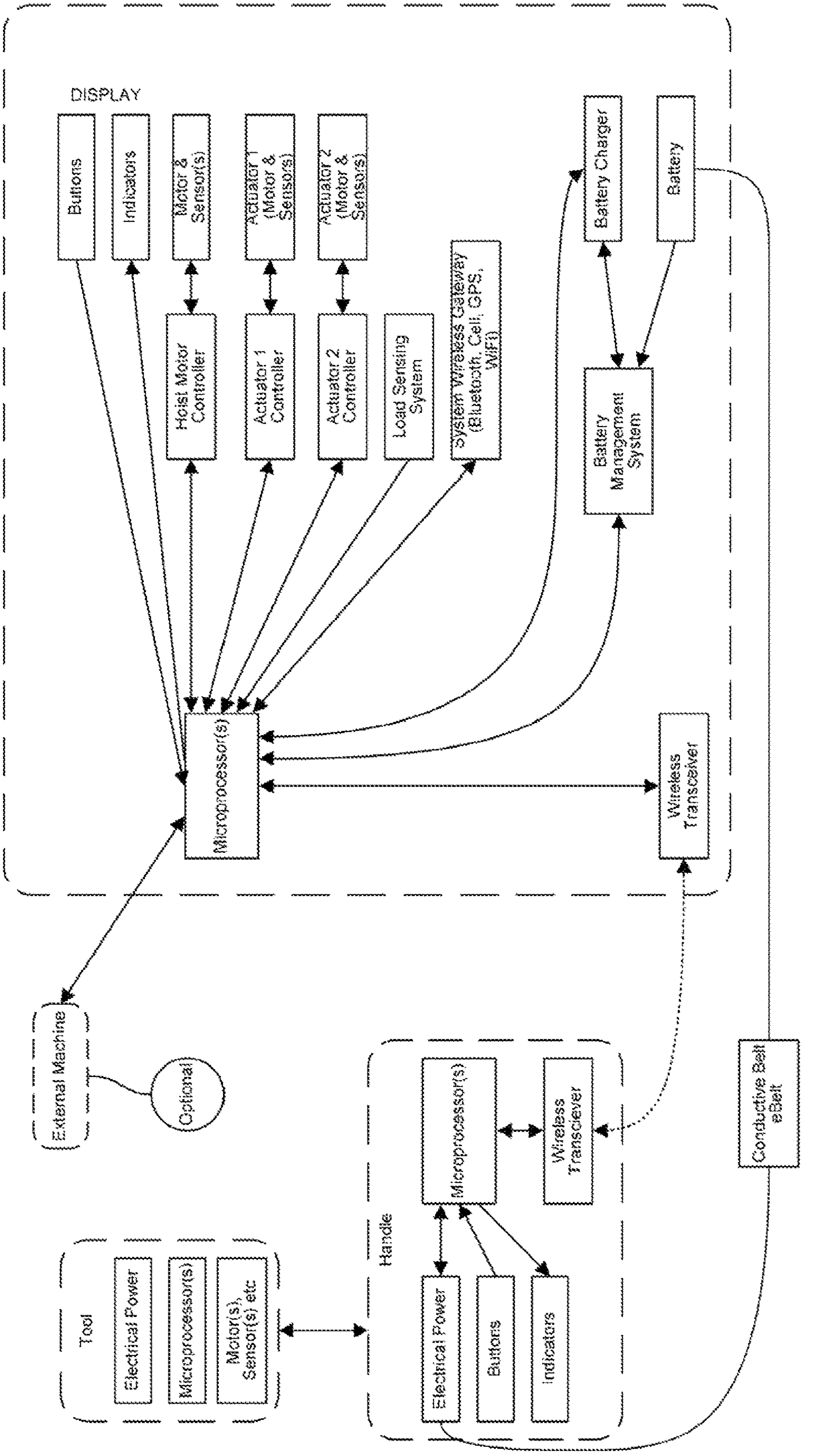
FIG. 32 is a flowchart depicting overall system data flow.

FIG. 32 is a flowchart depicting overall system data flow for one embodiment of the present invention. Different embodiments are likely to have revised data flow structures to fit their particular needs. The location of system microprocessors is noted in FIG. 32. It should be noted that in some embodiments of the present invention, wireless communication between the handle and the overall system controller is employed. The tool may also contain a microprocessor and related electronics. An optional external machine (or machines) may also be used with the various components of the present invention. Components that interface with the system level microprocessor include the hoist motor controller, actuator 1 controller, actuator 1 motor actuator 1 sensors, actuator 2 controller, actuator 2 motor actuator 2 sensors, a load sensing system, a system wireless gateway, buttons and indicators (display), hoist motor and hoist sensors, a battery management system with a charger and battery, and the like.

The present invention and the various embodiments described and depicted herein can operate using several different methods depending on the use of the Enhanced Lift Assist Device. This listing is by no mean exhaustive, but instead representative of the versatility of the Enhanced Lift Assist Device.

Method 1 describes the hoist system acting as a force balance. In this method the hoist seeks to maintain a constant force within the lifting element at all times. For instance, if the measured force value increases the hoist would be commanded down, seeking to reduce the force. Within this method additional safety constraints may be put into place to prevent exceeding sale bounds or changing the feel of the machine based on other system parameters. For example, hoist speed may be adjusted based on weight supported by the Enhanced Lift Assist Device to ensure safety of the operator.

Method 2 describes the hoist system reacting to a separate force input that is not based on tension of the lifting element. One embodiment of method 2 employs a force sensor within the handle, such that the Enhanced Lift Assist Device can be operated smoothly regardless of changes in lifting element tension. Lifting, element tension may be included within the controls scheme of this method but it is not the primary influencer.

Method 3 describes where the user gives the machine motion commands through button presses. The Enhanced Lift Assist Device can function as a standard lifting device in this manner and only move when directly commanded. In many embodiments this is useful for short durations but is by no means the primary control methodology.

Method 4 describes automated motion. Once triggered the Enhanced Lift Assist Device performs a specified sequence. Examples include slowly extending the lifting element until a critical force threshold has been achieved, or an automated lift sequence once a load has been released.

All methods of control of the present invention still rely on the overall machine safety logic to ensure safe operation.

Examples of additional software control functionality in some embodiments of the present invention are as follows.

Overload sensing and protection where the device detects an overload condition and only permits certain motions.

Adaptable motion where the device may have different velocity or acceleration parameters base on user control, weight that is being lifted, or status of the load.

Power conservation standby where the device is de-energized if an action hasn't occurred in a specified time period.

Configurable user interface where the user interface buttons may change based on the attached tool or other specified parameters.

Slack detection where the unit detects when the lifting element is slack or nearly slack and changes the operating mode. There may also be physical elements designed to prevent the lifting element from tangling in other components and falling out of its path.

The belt path may have twists and multi-planar bends, where the pulley location is set to induce minimal arm motion based on lifting element tension.

The device may also store balance points where different weights to balance are stored without re-learning, with balance settings easily interchangeable. Modifiers to the balance points may be software based, or may be linked to buttons on a user interface.

In some embodiments, a weighing learning sequence is employed that allows for weighing of a unit. The unit may, in some embodiments, be lifted a specified amount and then weighed.

Collision or fault recovery may also be provided in some embodiments of the present invention. If the device collides with an obstacle, tension within the lifting element changes drastically in a short amount of time, causing erratic device behavior. Under logic control, device response can be calmed without removing functionality from the user.

In some embodiments of the present invention, the device may include software based learning. For example, auto-weight calibration may be employed where the device monitors weights that it encounters over time and builds up a confidence of what the correct weight should be. The device is thus able to correct the weight value it has stored. Additionally, and in further embodiments of the present invention, automatic work zone limits may be employed where the device monitors the area that it is frequently used in. The device then stores those limit values and generates a soft-limit-of travel. In the case of an uncontrolled load caused by a variety of circumstances, the software control can stop motion at the soft-limits instead of traveling all the way to the device limits. Further embodiments may also employ additional functionality such as run-away detection where the device monitors the force input and motor speed at all times to allow for detection of a run-away condition. After a run-away condition occurs, a sequence is triggered that may cause an action such as lowering until the user takes control, but no lower than where the run-away started.

Machine (device) operational parameters may also be monitored. For example, expected acceleration vs. actual acceleration may be monitored. The machine (device) can then adapt its operational parameters to account for reality (such as a bearing failing, additional friction in the system, and the like). Connectivity devices as described above may be used to communicate any issues that are detected.

Additional software control functionality may also be provided, as necessitated, envisioned or described herein.

The present invention incorporates a tool connector 1107 (see FIG. 11) to facilitate the use of a variety of tools, such as the hook tool 1801 seen in FIG. 18. A novel gripping cam tool is depicted in FIGS. 33-38 that incorporates a gripping cam arrangement for the secure retention and release of a variety of materials, such as, but not limited to, concrete blocks or bricks.

Figure 33:
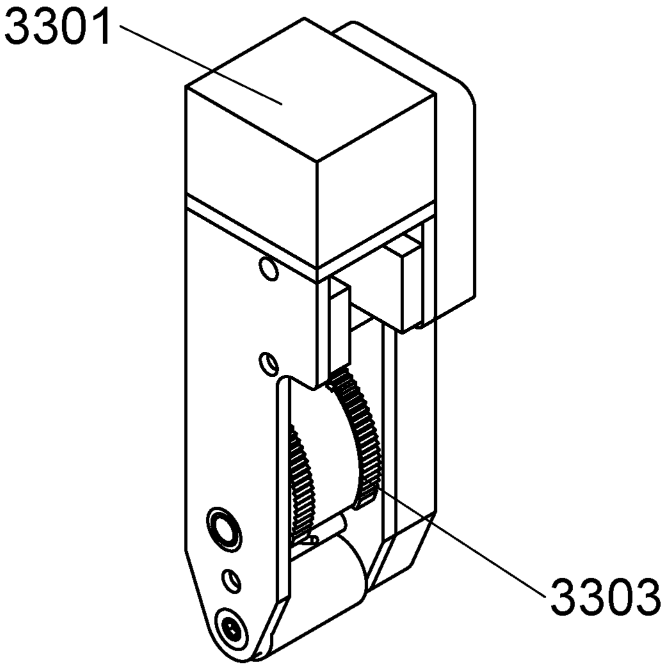
FIG. 33 depicts a first gripping module of a gripping cam tool in an open position.

FIG. 33 depicts a first gripping module 3301 of a gripping cam tool in an open position. The gripping module comprises a gripping cam 3303 that is pivotally connected to a body of the gripping module and will pivotally engage an object to be moved using an electric actuator, hydraulic controls, pneumatic controls, and the like. In FIG. 33, the gripping cam 3303 is in an open (ungripped) position.

Figure 34:
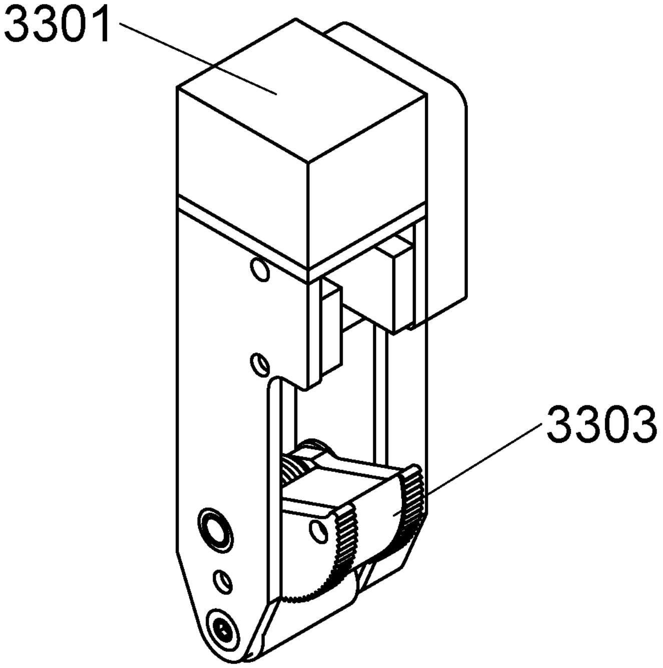
FIG. 34 depicts a first gripping module of a gripping cam tool in a closed position.

FIG. 34 depicts the first gripping module 3301 of the gripping cam tool in a closed (gripped) position. In some embodiments, the gripping cam 3303 has teeth, knurls, or other friction enhancing features.

Figure 35:
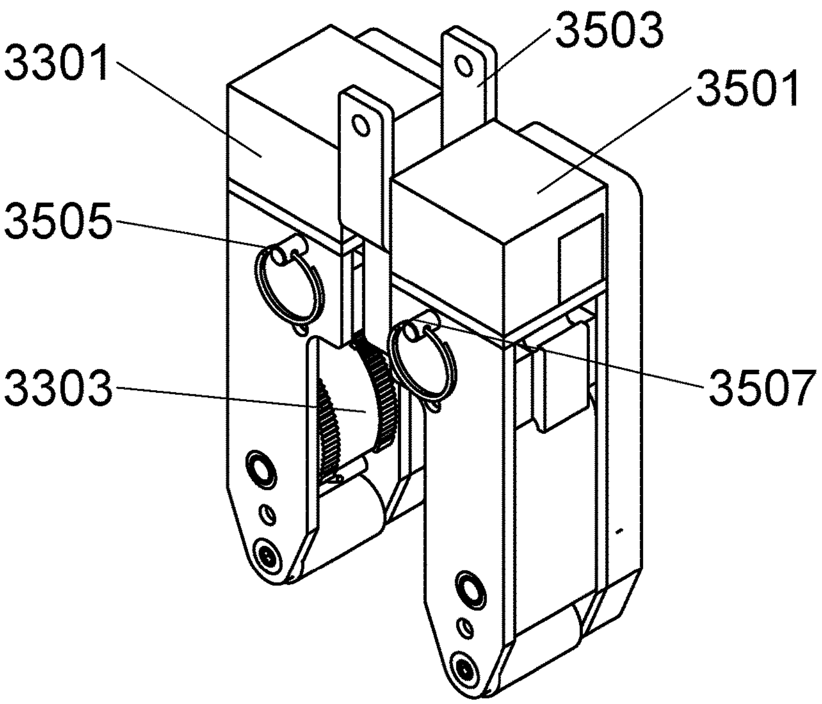
FIG. 35 depicts a gripping cam tool having a first gripping module and a second gripping module.
Figure 36:
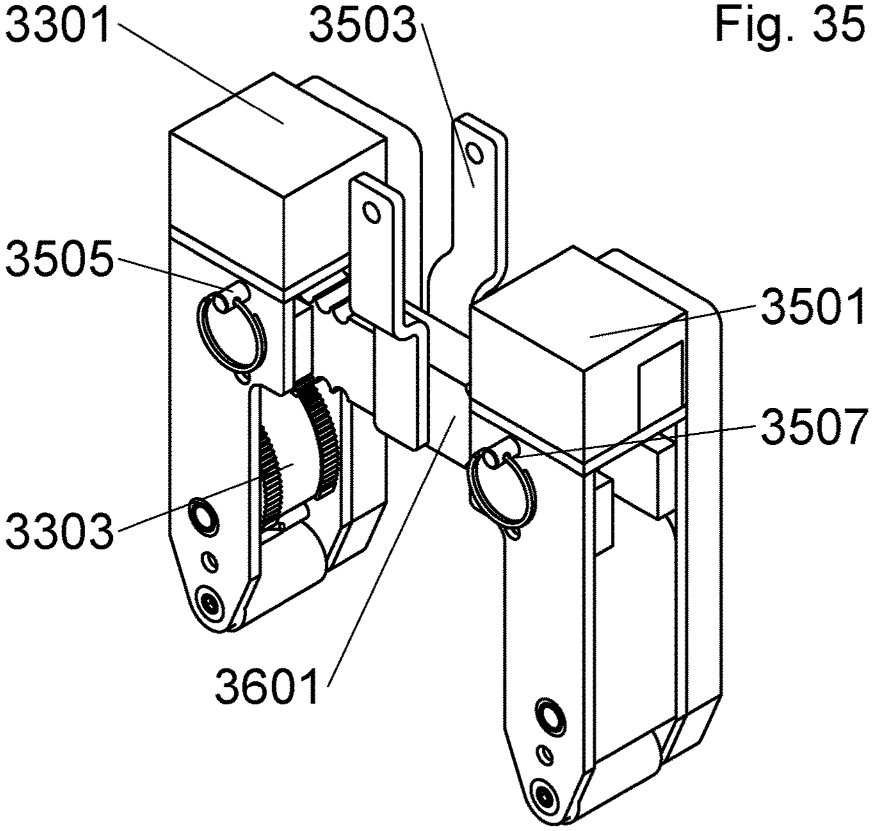
FIG. 36 depicts the gripping cam tool of FIG. 35 in an extended position.
Figure 37:
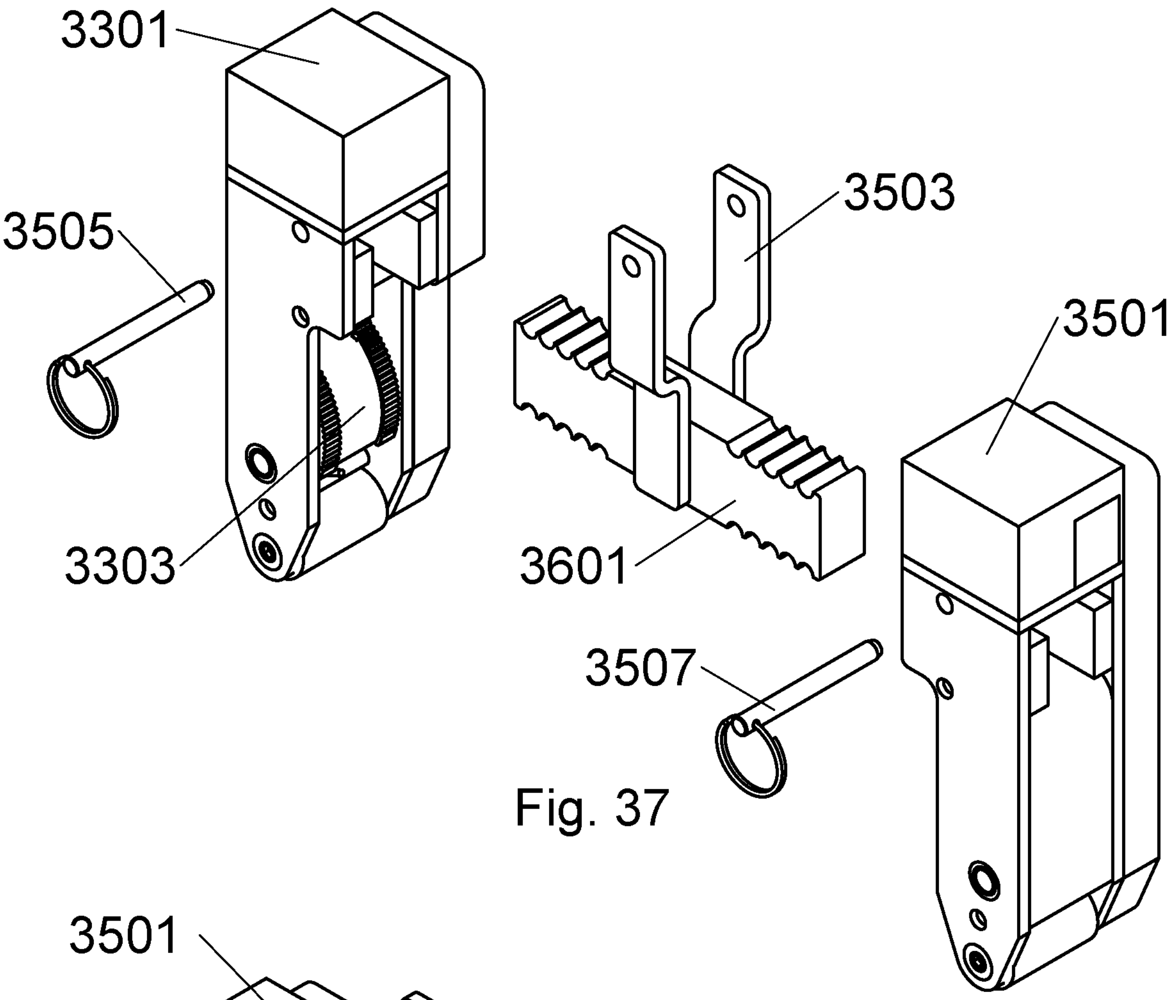
FIG. 37 depicts an exploded view of the gripping cam tool of FIG. 35.
Figure 38:
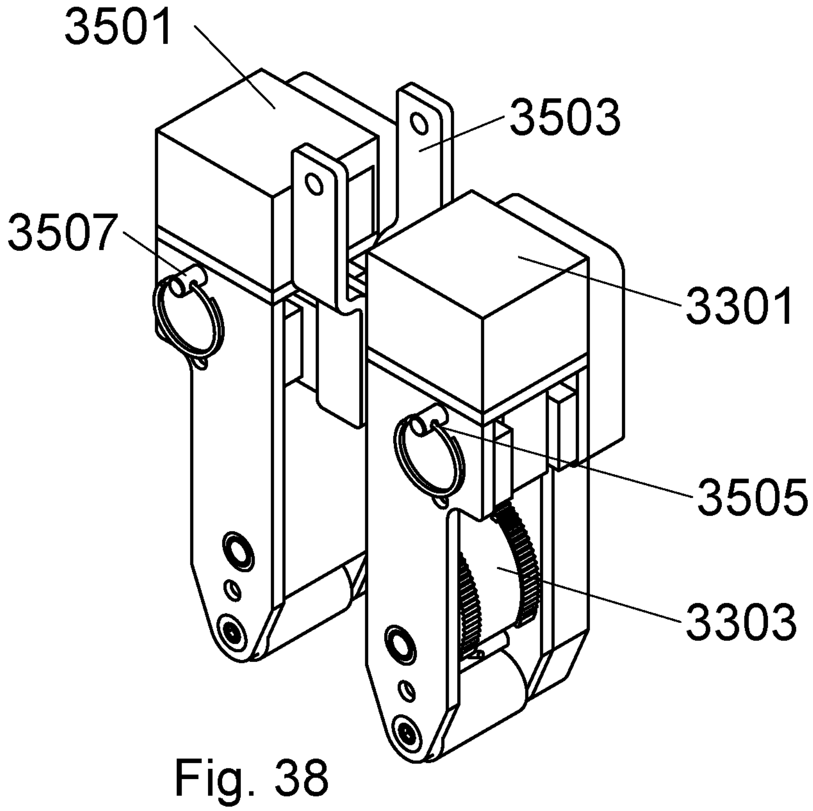
FIG. 38 depicts the gripping cam tool of FIG. 35 with the modules reversed.

FIG. 35 depicts a gripping cam tool having a first gripping module 3301 and a second gripping module 3501 interconnected with an adjustment member 3601 (see FIGS. 36 and 37). The gripping modules are adjustably connected to the adjustment member 3601 with a retention device such as the first retention pin 3505 and the second retention pin 3507. The gripping cams for each gripping module can be actuated simultaneously or separately to facilitate the retention and release of an element to be moved. Also seen in FIG. 35, and more clearly in FIG. 37, an attachment member 3503 is connected to the adjustment member 3601 for retention by the tool connector 1107 (see FIG. 11).

FIG. 36 depicts the gripping cam tool of FIG. 35 in an extended position where the adjustment member 3601 has been retained in an extended position through the placement of the first retention pin 3505 and the second retention pin 3507 in the appropriate slots or channels in the adjustment member 3601.

FIG. 37 depicts an exploded view of the gripping cam tool of FIG. 35 that clearly shows the interoperability between the adjustment member 3601 and the first grip module 3301 and the second grip module 3501.

In certain applications, it may be advantageous to provide a gripping force to the outside of the gripping cam tool, such as in the movement of a payload with a hollow core. As such, the gripping cam tool may be configured with the gripping modules reversed, as seen for example in FIG. 38.

It is, therefore, apparent that there has been provided, in accordance with the various objects of the present invention, an Enhanced Lift Assist Device.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and drawings appended herein.

What is claimed is:

1. An enhanced lift assist device, comprising:

an adjustable base;

an articulating arm assembly operably coupled to the adjustable base;

a control handle comprising a tool connector;

a lifting element comprising a belt containing at least one conductive element and driven by a drive motor where a distal end of the lifting element is connected to the control handle;

a moving contact for conveying electrical power and/or signals through the at least one conductive element of the belt to the control handle;

a force sensor that detects force applied by a user; and a force amplifier that converts user applied force received by the force sensor to mechanical force applied to a building element gripper to provide for movement of a building element by the building element gripper.

2. The enhanced lift assist device in accordance with claim 1, further comprising a battery.

3. The enhanced lift assist device in accordance with claim 1, further comprising a drum rotationally coupled to the drive motor and configured to wind and unwind the belt based on user applied force.

4. The enhanced lift assist device in accordance with claim 1, wherein the articulating arm assembly comprises a series of guide pulleys to direct the belt toward the control handle.

5. The enhanced lift assist device in accordance with claim 1, further comprising a dynamic base.

6. The enhanced lift assist device in accordance with claim 1, further comprising a static base.

7. The enhanced lift assist device in accordance with claim 1, wherein the articulating arm assembly comprises a first arm, a second arm, and a third arm.

8. The enhanced lift assist device in accordance with claim 1, wherein the control handle further comprises a controls section and an operator interface.

9. The enhanced lift assist device in accordance with claim 1, wherein the control handle further comprises a rechargeable battery pack.

10. The enhanced lift assist device in accordance with claim 1, wherein the control handle further comprises an ultracapacitor.

11. The enhanced lift assist device in accordance with claim 1, wherein the articulating arm further comprises an end pulley mechanically coupled to a rocker linkage wherein the rocker linkage is operatively coupled to a force sensor.

12. The enhanced lift assist device in accordance with claim 1, wherein the force sensor is operatively coupled to the drive motor that drives the lifting element.

13. The enhanced lift assist device in accordance with claim 1, further comprising a microprocessor for controlling the force applied to the lifting element by the drive motor in response to user controls and force sensor feedback.

* * * * *